United States Patent
Xu et al.

(10) Patent No.: US 12,167,491 B2
(45) Date of Patent: Dec. 10, 2024

(54) WIRELESS COMMUNICATION METHOD AND WIRELESS COMMUNICATION DEVICE FOR TRANSMITTING LINK CONTROL MESSAGES RELATED TO RELIABILITY RELATIONSHIPS

(71) Applicant: Sony Group Corporation, Tokyo (JP)

(72) Inventors: Xiaodong Xu, Beijing (CN); Mengying Sun, Beijing (CN); Shiqing Zhang, Beijing (CN); Wenbo Zhang, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/508,242

(22) Filed: Nov. 14, 2023

(65) Prior Publication Data

US 2024/0090071 A1     Mar. 14, 2024

Related U.S. Application Data

(63) Continuation of application No. 17/736,092, filed on May 4, 2022, now abandoned, which is a continuation
(Continued)

(30) Foreign Application Priority Data

Sep. 8, 2017   (CN) .......................... 201710805480.2

(51) Int. Cl.
*H04W 76/25*     (2018.01)
*H04W 24/08*     (2009.01)
*H04W 76/30*     (2018.01)

(52) U.S. Cl.
CPC ........... *H04W 76/25* (2018.02); *H04W 24/08* (2013.01); *H04W 76/30* (2018.02)

(58) Field of Classification Search
CPC ...... H04W 76/25; H04W 76/30; H04W 24/08
See application file for complete search history.

(56) References Cited

U.S. PATENT DOCUMENTS 9,554,366 B2    1/2017    Anchan et al.
2012/0188928 A1    7/2012    Wang et al.
(Continued)

FOREIGN PATENT DOCUMENTS

CN     102036349 A     4/2011
CN     102209302 A     10/2011
(Continued)

OTHER PUBLICATIONS

International Search Report and Written Opinion mailed on Oct. 31, 2018 for PCT/CN2018/103738 filed on Sep. 3, 2018, 8 pages including English Translation of the International Search Report.

*Primary Examiner* — Chi H Pham
*Assistant Examiner* — Weibin Huang
(74) *Attorney, Agent, or Firm* — XSENSUS LLP

(57) ABSTRACT

Disclosed in the present invention are a wireless communication method and a wireless communication device. An electronic device in communication with a counterpart communication device comprises a processing circuit, the processing circuit being configured to: determine the state of a link between the electronic device and the counterpart communication device by means of measuring a link maintenance message transmitted by the counterpart communication device when a predetermined condition relative to the counterpart communication device is met, but not to transmit a feedback message for the link maintenance message, wherein the link maintenance message is used for confirming that the link is maintained between the electronic device and the counterpart communication device.

7 Claims, 21 Drawing Sheets

Related U.S. Application Data of application No. 16/634,583, filed as application No. PCT/CN2018/103738 on Sep. 3, 2018, now Pat. No. 11,357,069.

(56) References Cited

U.S. PATENT DOCUMENTS

| | | | |
|---|---|---|---|
| 2012/0287979 | A1 | 11/2012 | Garrett et al. |
| 2013/0294331 | A1* | 11/2013 | Wang ................... H04B 7/2606 |
| | | | 370/315 |
| 2014/0064209 | A1 | 3/2014 | Anchan et al. |
| 2016/0277948 | A1 | 9/2016 | Yeo et al. |
| 2016/0381491 | A1* | 12/2016 | Watfa ..................... H04W 4/08 |
| | | | 455/41.2 |
| 2017/0086119 | A1 | 3/2017 | Xu et al. |
| 2017/0289086 | A1* | 10/2017 | Grotto ................... H04L 51/226 |
| 2017/0317740 | A1 | 11/2017 | Basu Mallick et al. |
| 2018/0139681 | A1* | 5/2018 | Jung ................. H04W 56/0015 |
| 2018/0139684 | A1* | 5/2018 | Aminaka .............. H04W 40/22 |
| 2018/0184436 | A1* | 6/2018 | Ohtsuji ................ H04W 8/005 |
| 2019/0356400 | A1* | 11/2019 | Muraoka .............. H04B 17/318 |
| 2019/0373652 | A1 | 12/2019 | Hong et al. |
| 2020/0163155 | A1 | 5/2020 | Lee et al. |
| 2021/0112574 | A1* | 4/2021 | Hosseini ............... H04L 5/0055 |
| 2023/0319850 | A1* | 10/2023 | Selvanesan ........... H04W 72/02 |
| | | | 370/329 |

FOREIGN PATENT DOCUMENTS

| | | |
|---|---|---|
| CN | 104363579 A | 2/2015 |
| CN | 105050152 A | 11/2015 |
| CN | 105812046 A | 7/2016 |
| CN | 106686674 A | 5/2017 |
| WO | 2009/011734 A1 | 1/2009 |

\* cited by examiner

WIRELESS COMMUNICATION METHOD AND WIRELESS COMMUNICATION DEVICE FOR TRANSMITTING LINK CONTROL MESSAGES RELATED TO RELIABILITY RELATIONSHIPS

CROSS-REFERENCE TO RELATED APPLICATIONS

The present application is a continuation of U.S. application Ser. No. 17/736,092, filed May 4, 2022, which is a continuation of U.S. application Ser. No. 16/634,583, filed Jan. 28, 2020, (Now U.S. Pat. No. 11,357,069) which is based on PCT filing PCT/CN2018/103738, filed Sep. 3, 2018, which claims priority to CN 201710805480.2, filed Sep. 8, 2017, the entire contents of each are incorporated herein by reference.

FIELD

The present disclosure relates to a wireless communication method and a wireless communication device, and in particular, to a method for maintaining a link between a relay device and a remote device and the relevant relay device and remote device.

BACKGROUND

In recent years, machine-type communication (MTC) devices, which have low power consumption and low processing capabilities, are widely used in wireless communication networks. The MTC devices typically include narrow-band Internet of Things (NB-IoT) devices and wearable devices, such as smart watch, smart glasses, wireless point-of-sale (POS) machine and smart meter. The MTC device generally accesses a network via a relay device. For example, the relay device may be implemented by a mobile terminal and the MTC device may be connected with a base station via the mobile terminal. A link between the MTC device and the relay device is referred to as a sidelink. The MTC device and the relay device determine the presence of the sidelink and a state of the sidelink by periodically transmitting signaling to each other, which is referred to as link maintenance. The purpose of the link maintenance is to enable the MTC device and the relay device to grasp the state of the sidelink and to ensure continuity of service. Hereinafter, the MTC device is referred to as a remote device and the sidelink is simply referred to as a link.

FIG. 1 exemplarily shows a signaling flow of the conventional link maintenance. As shown in FIG. 1, in step S100, a device 100 (which may be any one of the remote device and the relay device) initiating a link maintenance process transmits a link maintenance message to a counterpart device 200. The counterpart device 200 measures the received link maintenance message to determine a state of a link, and in step S200, the counterpart device 200 transmits an acknowledgement signal ACK to the device 100. The devices 100 and 200 perform link maintenance by repeatedly performing steps S100 and S200.

In the flow shown in FIG. 1, a large amount of signaling overheads and energy consumption are inevitably generated due to the periodic bidirectional signaling interaction between the remote device and the relay device, which becomes more prominent in the case that one relay device are connected with multiple remote devices at the same time. Furthermore, the bidirectional link maintenance shown in FIG. 1 is only applicable in a bidirectional relay mode where the remote device and the relay device may transmit and receive messages to and from each other. The bidirectional link maintenance is not applicable in a unidirectional relay mode. In the unidirectional relay mode, the relay device can receive a message from the remote device while the remote device cannot receive a message from the relay device. Therefore, step S200 shown in FIG. 1 cannot be performed in the unidirectional relay mode.

SUMMARY

In view of above, a scheme for implementing link maintenance between a remote device and a relay device is provided according to the present disclosure, with which one or more problems described above may be solved.

According to an aspect of the present disclosure, an electronic device performing communication with a counterpart communication device is provided. The electronic device includes a processing circuit configured to: when the electronic device and the counterpart communication device satisfy a predetermined condition, determine a state of a link between the electronic device and the counterpart communication device by measuring a link maintenance message transmitted by the counterpart communication device, without transmitting a feedback message in response to the link maintenance message, wherein the link maintenance message is used for confirmation on link maintenance between the electronic device and the counterpart communication device.

According to another aspect of the present disclosure, an electronic device performing communication with a counterpart communication device is provided. The electronic device includes a processing circuit configured to: when the electronic device and the counterpart communication device satisfy a predetermined condition, measure a link maintenance message transmitted by the counterpart communication device, without transmitting a feedback message in response to the link maintenance message; and notify a base station of a measurement result, wherein the link maintenance message is used for confirmation on link maintenance between the electronic device and the counterpart communication device.

According to another aspect of the present disclosure, an electronic device performing communication with a counterpart communication device is provided. The electronic device includes a processing circuit configured to: determine a state of a link between the electronic device and the counterpart communication device by measuring a link maintenance message transmitted by the counterpart communication device, wherein the link maintenance message is used for confirmation on link maintenance between the electronic device and the counterpart communication device; and determine, based on the state of the link, a timing at which the counterpart communication device transmits a next link maintenance message.

According to another aspect of the present disclosure, an electronic device performing communication with a counterpart communication device is provided. The electronic includes a processing circuit configured to: determine a state of a link between the electronic device and the counterpart communication device by measuring a link maintenance message transmitted by the counterpart communication device, wherein the link maintenance message is used for confirmation on link maintenance between the electronic device and the counterpart communication device; determine, based on the state of the link, a timing at which the counterpart communication device transmits a next link maintenance message; and notify a base station of the determined timing.

According to another aspect of the present disclosure, an electronic device performing communication with a counterpart communication device is provided. The electronic device includes a processing circuit configured to: measure a link maintenance message transmitted by the counterpart communication device, wherein the link maintenance message is used for confirmation on link maintenance between the electronic device and the counterpart communication device; notify a base station of a measurement result; and receive a next link maintenance message from the counterpart communication device according to a timing notified by the base station, wherein the timing is determined by the base station based on the measurement result.

According to another aspect of the present disclosure, an electronic device performing communication with multiple communication devices is provided. The multiple communication devices are divided into one or more groups. The electronic device includes a processing circuit configured to: determine, for each group, a primary communication device of the group; measure a link maintenance message transmitted by the primary communication device of each group; and generate a first feedback message based on a measurement result, which message is to be fed back to each communication device in the group.

According to another aspect of the present disclosure, an electronic device performing communication with multiple communication devices is provided. The multiple communication devices are divided into one or more groups, the electronic device includes a processing circuit configured to: determine, for each group, a primary communication device of the group; measure a link maintenance message transmitted by the primary communication device of each group; and generate a first feedback message for the group based on a measurement result, which message is to be transmitted to a base station, wherein the base station transmits the first feedback message to each communication device in the group.

According to another aspect of the present disclosure, an electronic device performing communication with multiple communication devices is provided. The electronic device includes a processing circuit configured to: based on grouping information acquired from a base station, group multiple communication devices and determine a primary communication device for each group, wherein the base station generates the grouping information based on positions of multiple communication devices; measure a link maintenance message transmitted by the primary communication device of each group; and transmit a measurement result to the base station.

BRIEF DESCRIPTION OF THE DRAWINGS

The present disclosure may be better understood with reference to the description given hereinafter in conjunction with the drawings. The same or similar reference numbers are used to represent the same or similar components throughout the drawings. The drawings together with the following detailed description are included in the specification and form a part of the specification, and are used to illustrate embodiments of the present disclosure and explain the principle and advantages of the present disclosure. In the drawings.

DETAILED DESCRIPTION OF EMBODIMENTS

Figure 1:
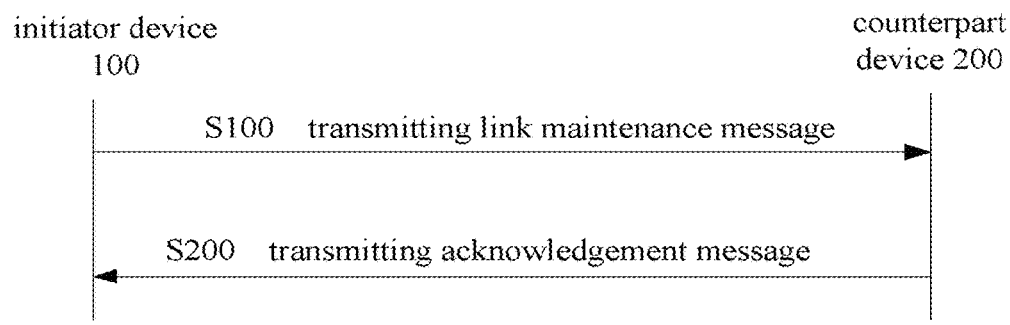
FIG. 1 schematically shows a signaling flow of the conventional link maintenance.
Figure 2A:
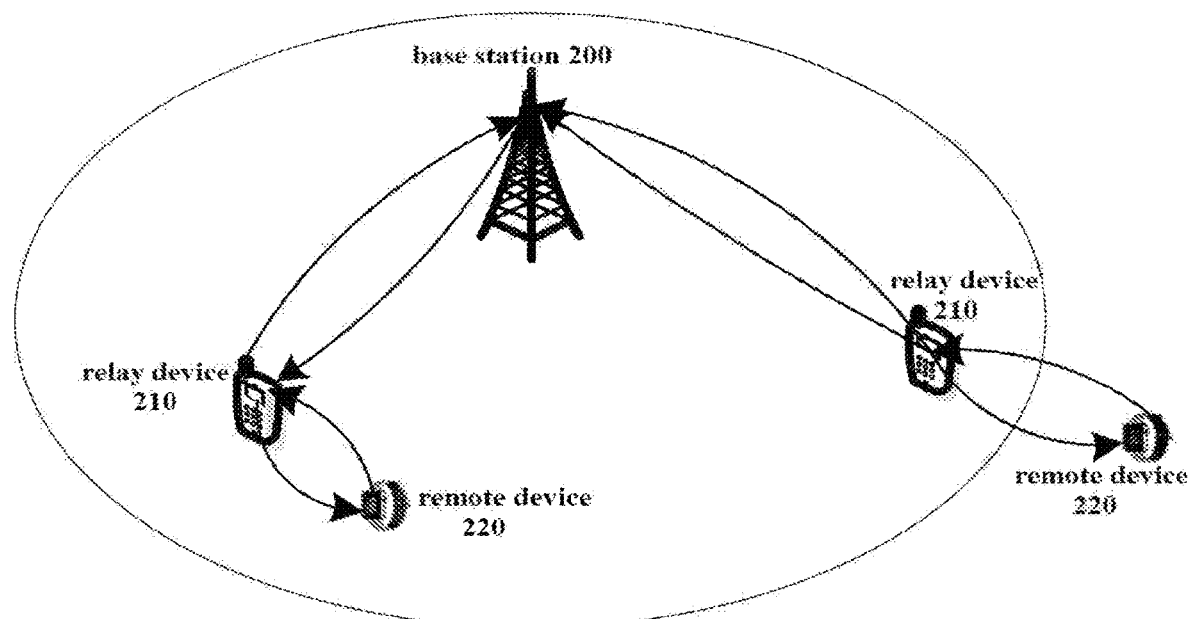
FIG. 2A schematically shows an architecture of a communication system in a bidirectional relay mode.

Firstly, a first embodiment of the present disclosure is described with reference to FIG. 2A and FIG. 2B. FIG. 2A schematically shows an architecture of a communication system in a bidirectional relay mode. As shown in FIG. 2A, a base station 200 communicates with two relay devices 210 respectively, and each of the relay devices 210 communicates with a corresponding remote device 220, such that the remote device 220 can access a network via the relay device 210. Messages are transmitted between the relay device 210 and the remote device 220 in a bidirectional manner.

Figure 2B:
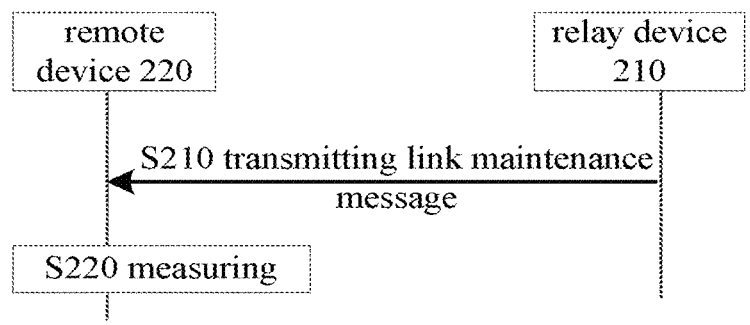
FIG. 2B shows a signaling flow of link maintenance according to a first embodiment of the present disclosure.

FIG. 2B shows a signaling flow of link maintenance according to the first embodiment of the present disclosure. In the embodiment, if the relay device 210 and the remote device 220 satisfy at least one of the following conditions: the relay device 210 and the remote device 220 have a mutual trust relationship, and a connection between the relay device 210 and the remote device 220 has been maintained for a long time period, the device that receives a link maintenance message may not transmit an acknowledgement message to the counterpart device.

Herein, in the case that a connection is established between the relay device 210 and the remote device 220, the relay device 210 may request the network side to establish a trust relationship between the relay device 210 and the remote device 220, and the trust relationship between the relay device 210 and the remote device 220 may be stored in an entity at the network side, for example, in a Mobility Management Entity (MME). Furthermore, a long-time connection means the duration of the connection between the relay device 210 and the remote device 220 exceeds a predetermined time period.

Satisfying one of the above conditions generally means that there is a stable connection between the relay device 210 and the remote device 220, and in this case, the signaling interaction may be omitted. Therefore, as shown in FIG. 2B, in the embodiment, the relay device 210 transmits a link maintenance message to the remote device 220 in step S210, and the remote device 220 measures the received link maintenance message in step S220 to determine a state of the link. Specifically, the remote device 220 does not feedback an acknowledgement message to the relay device 210. After a predetermined time period elapses, the relay device 210 transmits the next link maintenance message to the remote device 220. The relay device 210 and the remote device 220 perform link maintenance by repeatedly performing steps S210 and S220.

In the embodiment, signaling overheads and energy consumption may be efficiently reduced by omitting transmission of the acknowledgement message. In the case that multiple remote devices 220 are connected to the same relay device 210, this advantage is more significant.

In another aspect, in the case that the relay device 210 and the remote device 220 do not satisfy the above conditions, the transmission of the acknowledgement message cannot be omitted. Therefore, three manners for determining whether to omit the acknowledgement message are provided according to the present disclosure.

In a first manner, a link maintenance message transmitted by the relay device 210 includes an indicator that indicates whether an acknowledgement message needs to be transmitted, for example, the link maintenance message includes a field for indicating whether an acknowledgement message needs to be transmitted. In the case that the relay device 210 determines that one of the above conditions is satisfied, the field is set to be a value indicating that no acknowledgement message needs to be transmitted. Otherwise, in the case that the relay device 210 determines that none of the above conditions is satisfied, the field is set to be a value indicating that an acknowledgement message needs to be transmitted.

In a second manner, the relay device 210 and the remote device 220 each determine whether one of the above conditions is satisfied. In the case that one of the above conditions is satisfied, the remote device 220 does not feedback an acknowledgement message after receiving the link maintenance message.

In a third manner, trust relationship and connection state between the relay device 210 and the remote device 220 are stored in an entity at the network side. In the case of determining that one of the above conditions is satisfied, the entity at the network side instructs, via a base station, the relay device 210 and the remote device 220 to perform a process in which the acknowledgement message is omitted.

Figure 3A:
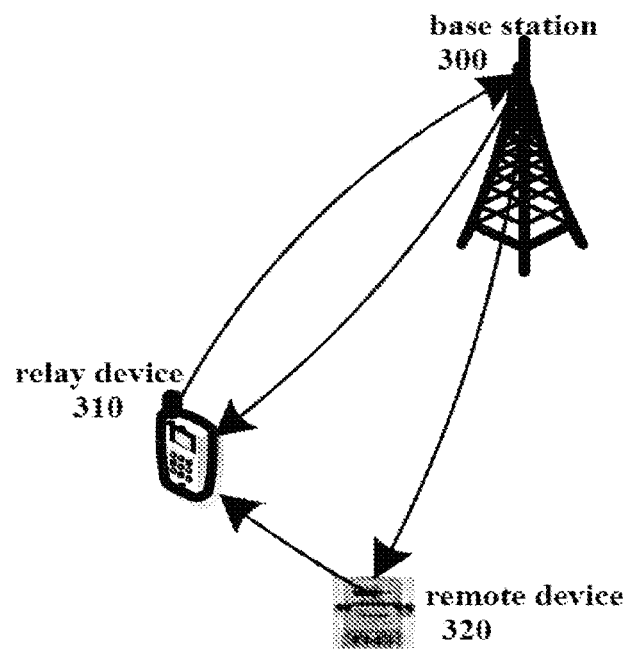
FIG. 3A schematically shows an architecture of a communication system in a unidirectional relay mode.

A second embodiment according to the present disclosure is described below in conjunction with FIG. 3A to FIG. 3C. FIG. 3A schematically shows an architecture of a communication system in a unidirectional relay mode. As shown in FIG. 3A, a base station 300 communicates with a relay device 310, and the relay device 310 performs unidirectional communication with a remote device 320. That is, the relay device 310 can receive a message from the remote device 320, and the remote device 320 cannot receive a message from the relay device 310. Therefore, the relay device 310 needs to transmit a message that is to be transmitted to the remote device, to the base station 300, and then the base station 300 transmits the message to the remote device 320.

Similar to the first embodiment, in the second embodiment, in the case that the relay device 310 and the remote device 320 satisfy one of the above conditions, the transmission of an acknowledgement message in response to the link maintenance message may be omitted. Furthermore, in the embodiment, three manners as described above may be employed to determine whether to perform a process in which the acknowledgement message is omitted.

Figure 3B:
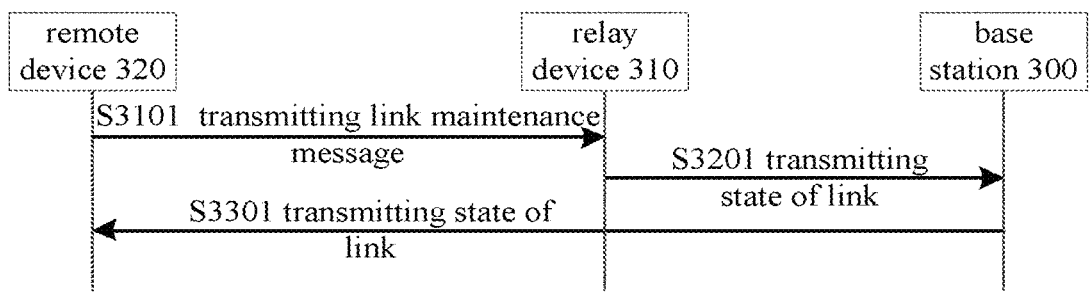
FIG. 3B shows a first signaling flow of link maintenance according to a second embodiment of the present disclosure.

FIG. 3B shows a first signaling flow of link maintenance according to the second embodiment of the present disclosure. As shown in FIG. 3B, in step S3101, the remote device 320 transmits a link maintenance message to the relay device 310. The relay device 310 measures the received link maintenance message and determines a state of link based on the measurement result. Then, the relay device 310 transmits the determined link state information to the base station 300 in step S3201, and the base station 300 transmits the link state information to the remote device 320 in step S3301, so that the remote device 320 may be aware of the state of the link.

Figure 3C:
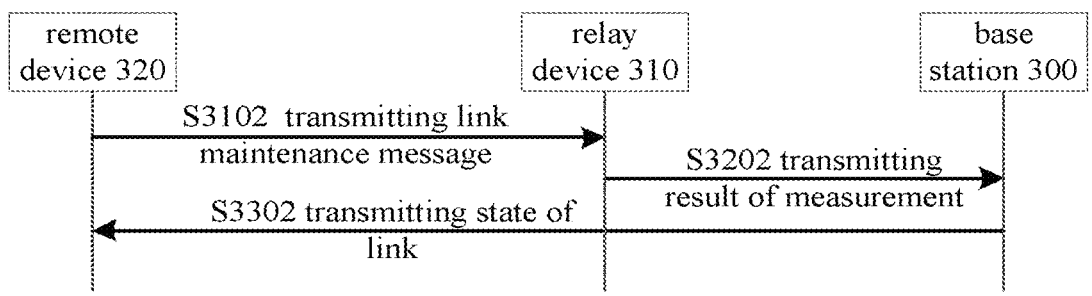
FIG. 3C shows a second signaling flow of link maintenance according to the second embodiment of the present disclosure.

FIG. 3C shows a second signaling flow of link maintenance according to the second embodiment of the present disclosure. As shown in FIG. 3C, in step S3102, the remote device 320 transmits a link maintenance message to the relay device 310. The relay device 310 measures the received link maintenance message and transmits the measurement result to the base station 300 in step S3202. The base station 300 determines a state of a link between the relay device 310 and the remote device 320 based on the received measurement result, and notifies the remote device 320 of the determined state of the link in step S3302.

A third embodiment according to the present disclosure is described below in conjunction with FIG. 4A to FIG. 4D. Unlike the first embodiment and the second embodiment, a process in which an acknowledgement message is omitted is not employed in the third embodiment. The third embodiment is applicable to the architecture of the communication system shown in FIG. 2A, that is, a bidirectional communication may be performed between the relay device and the remote device.

Figure 4A:
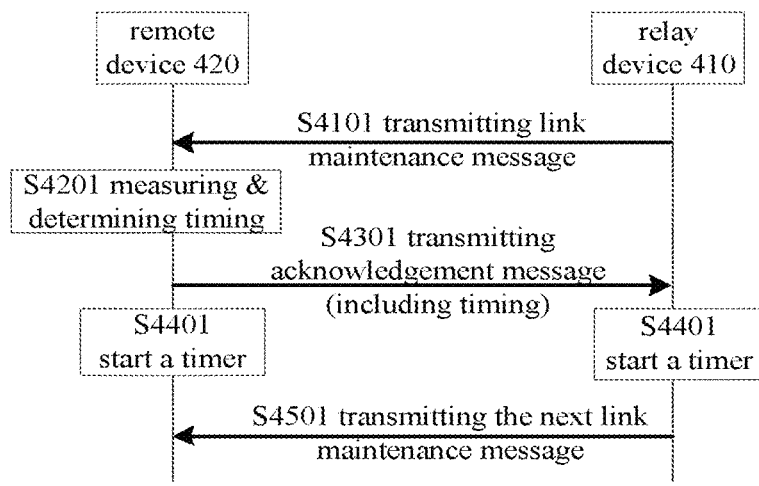
FIG. 4A shows a first signaling flow of link maintenance according to a third embodiment of the present disclosure.

FIG. 4A shows a first signaling flow of link maintenance according to the third embodiment of the present disclosure. As shown in FIG. 4A, in step S4101, a relay device 410 transmits a link maintenance message to a remote device 420. The remote device 420 determines a state of link by measuring the received link maintenance message, and determines a timing at which the relay device 410 transmits the next link maintenance message based on the state of link determined currently and the historical states of the link determined previously, as shown in step S4201.

Specifically, the remote device 420 measures the received link maintenance message and determines a level of the state of link by comparing the measurement result (for example, the receiving power) and a predetermined threshold. The following Table 1 shows an example of determination of the level of the state of link.

TABLE 1

| level of the state of link | condition |
| --- | --- |
| level 1 | measurement result > threshold 2 |
| level 2 | threshold 2 > measurement result > threshold 1 |

In Table 1, the threshold 2 is greater than the threshold 1. In the case that the measurement result is less than the threshold 1, the link is unavailable. In the case that the measurement result is greater than the threshold 2, the level of the state of link is level 1. In the case that the measurement result is greater than the threshold 1 and less than the threshold 2, the level of the state of link is level 2.

The remote device 420 may determine a timing for transmitting the next link maintenance message based on the level of the state of link determined currently and the level of the state of link determined previously. The level of the state of link determined previously is determined by the remote device 420 by measuring the link maintenance message which was received previously. Table 2 shows an example of determination of timing. In Table 2, the remote device 420 determines a timing for transmitting the next link maintenance message based on the levels of the state of link determined for the last four times.

TABLE 2

| level measured for the (t-3)th time | level measured for the (t-2)th time | level measured for the (t-1)th time | level measured currently (for the t-th time) | multiple of minimum time unit |
| --- | --- | --- | --- | --- |
| any | any | any | level 2 | 1 |
| any | any | level 2 | level 1 | 2 |
| any | level 2 | level 1 | level 1 | 4 |
| level 2 | level 1 | level 1 | level 1 | 8 |
| level 1 | level 1 | level 1 | level 1 | 16 |

In Table 2, the timing for transmitting the next link maintenance message is defined by a multiple of the minimum time unit (e.g., 1, 2, 4, etc.). For example, as shown in the first row of the table, regardless of the levels of the state of link determined for the last three times, the next link maintenance message is transmitted when one minimum time unit elapses as long as the level of the state of link determined currently is level 2. For example, as shown in the fourth row of the table, in the case that the level of the state of link is determined to be level 1 for all of the last four times, the next link maintenance message is transmitted when 16 minimum time units elapse.

It is to be noted that, Table 1 and Table 2 only show examples of determination of the level of the state of link and determination of transmission timing. It is easy for those skilled in the art to design different schemes according to actual requirement.

After determining a timing for transmitting the next link maintenance message, the remote device 420 includes the determined timing in an acknowledgement message to transmit to the relay device 410 in step S4301. Then, in step S4401, the remote device 420 and the relay device 410 start a timer, an expiration time of which corresponds to the timing determined by the remote device 420 to transmit the next link maintenance message. It is to be noted that, the time taken for signal transmission from the remote device 420 to the relay device 410 is short with respect to the duration of the timer, and therefore the time taken for signal transmission may be ignored. It may be considered that the remote device 420 and the relay device 410 start the timer at the same time.

During the timer is started, the relay device 410 does not transmit a link maintenance message, and the remote device 420 also does not monitor the link maintenance message. When the timer expires, the relay device 410 transmits the next link maintenance message in step S4501. Then, steps S4201 to S4401 are repeated.

Figure 4B:
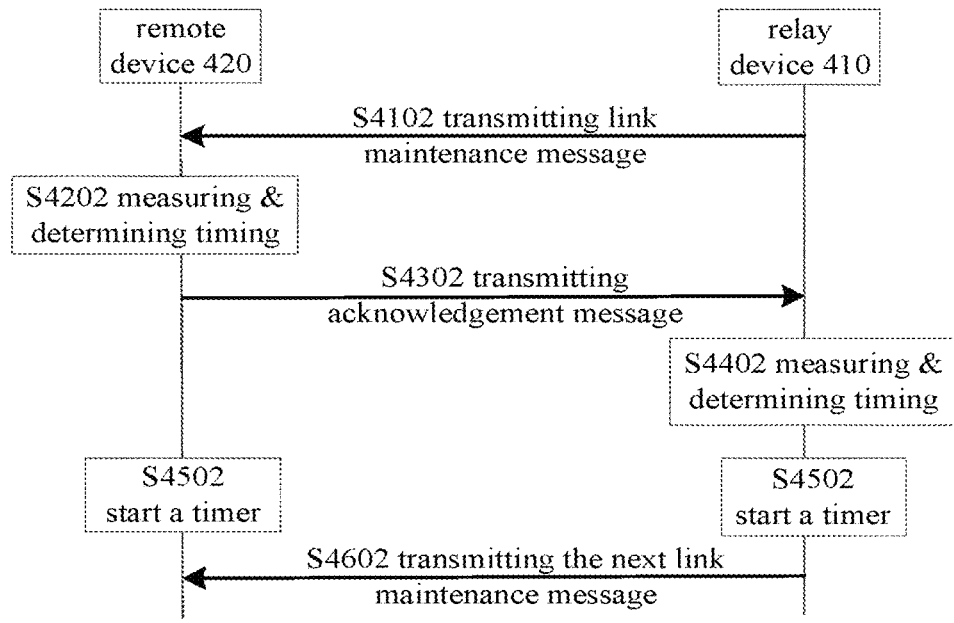
FIG. 4B shows a second signaling flow of link maintenance according to the third embodiment of the present disclosure.

FIG. 4B shows a second signaling flow of link maintenance according to the third embodiment of the present disclosure. In the embodiment, the relay device 410 and the remote device 420 store in advance the same table for determining transmission of the timing, such as Table 1 and Table 2 described above. As shown in FIG. 4B, in step S4102, the relay device 410 transmits a link maintenance message to the remote device 420. The remote device 420 determines a state of a link by measuring the received link maintenance message and determines, based on the state of link determined currently and historical states of the link determined previously, a timing at which the relay device 410 transmits the next link maintenance message, as shown in step S4202. Steps S4102 and S4202 are the same as steps S4101 and S4202 shown in FIG. 4A and the description thereof is omitted here.

In step S4302, the remote device 420 transmits an acknowledgement message to the relay device 410 in response to the link maintenance message, and the acknowledgement message does not include the timing determined by the remote device 420. In step S4502, the remote device 420 starts a timer, an expiration time of which corresponds to the determined timing.

In step S4402, the relay device 410 measures the received acknowledgement message, determines the current level of the state of link, and determines a timing for transmitting the next link maintenance message based on the level of the state of link determined currently and the levels of the historical state of link determined based on the acknowledgement message received previously. Since the relay device 410 and the remote device 420 use the same table, it may be considered that the same timing is determined by the relay device 410 and the timing determined by the remote device 420. Then, in step S4502, the relay device 410 starts the timer corresponding to the determined timing. Since the time taken for information processing by the relay device 410 and the remote device 420 and the time taken for signal transmission of the relay device 410 and the remote device 420 are short with respect to the duration of the timer, the time taken for information processing and the time taken for signal transmission may be ignored. It may be considered that the relay device 410 and the remote device 420 start the timer at the same time.

When the timer expires, in step S4602, the relay device 410 transmits a next link maintenance message to the remote device 420. Then, steps S4202 to S4502 are repeated.

Figure 4C:
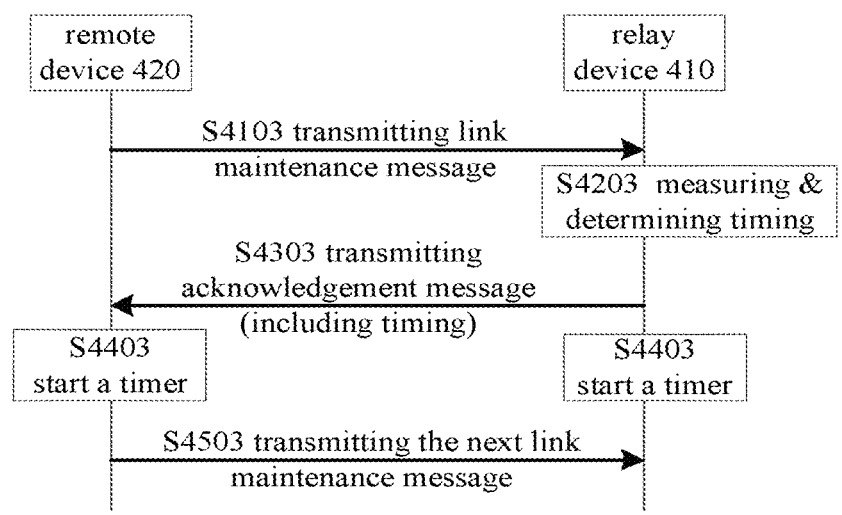
FIG. 4C show a third signaling flow of link maintenance according to the third embodiment of the present disclosure.

FIG. 4C shows a third signaling flow of link maintenance according to the third embodiment of the present disclosure. As shown in FIG. 4C, in step S4103, the remote device 420 transmits a link maintenance message to the relay device 410. The relay device 410 determines a level of a state of link by measuring the received link maintenance message, and determines a timing at which the remote device 420 transmits the next link maintenance message based on the level of the state of link determined currently and the levels of the historical states of link determined previously, as shown in step S4203. The manner for determining the timing is the same as that descried in conjunction with FIG. 4A, and therefore is omitted here.

Then, in step S4303, the relay device 410 includes the determined timing in an acknowledgement message to transmit to the remote device 420. In step S4403, the remote device 420 and the relay device 410 start a timer (the time taken for signal transmission may be ignored), an expiration time of which corresponds to the timing determined by the relay device 410 to transmit the next link maintenance message.

During the timer is started, the remote device 420 does not transmit a link maintenance message, and the relay device 410 also does not monitor the link maintenance message. When the timer expires, the remote device 420 transmits the next link maintenance message, as shown in step S4503. Then, steps S4203 to S4403 are repeated.

Figure 4D:
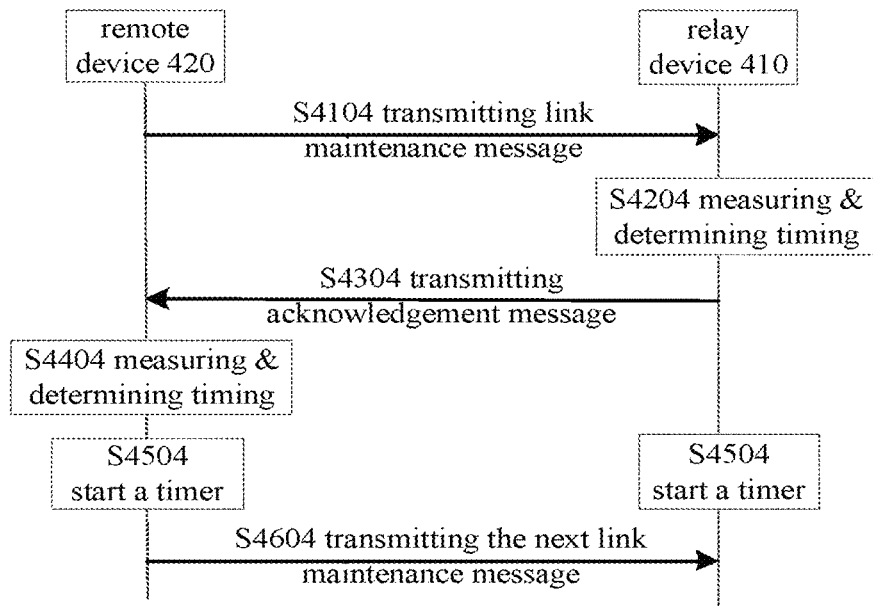
FIG. 4D shows a fourth signaling flow of link maintenance according to the third embodiment of the present disclosure.

FIG. 4D shows a fourth signaling flow of link maintenance according to the third embodiment of the present disclosure. In the embodiment, the relay device 410 and the remote device 420 store in advance the same table for determining the transmission of the timing, such as Table 1 and Table 2 described above. As shown in FIG. 4D, in step S4104, the remote device 420 transmits a link maintenance message to the relay device 410. The relay device 410 determines a level of a state of link by measuring the received link maintenance message, and determines a timing at which the remote device 420 transmits the next link maintenance message based on the level of the state of link determined currently and the levels of the historical states of link, as shown in step S4204.

Then, in step S4304, the relay device 410 transmits an acknowledgement message to the remote device 420. The acknowledgement message does not include the timing determined by the relay device 410. In step S4504, the relay device 410 starts a timer, an expiration time of which corresponds to the determined timing.

In another aspect, the remote device 420 determines a level of a state of link by measuring the received acknowledgement message, and determines a timing for transmitting the next link maintenance message based on the level of the state of link determined currently and the levels of the historical states of link, as shown in step S4404. The levels of the historical states of link are determined based on the acknowledgement message received previously. Since the relay device 410 and the remote device 420 use the same tables, it may be considered that the same timing is determined by the relay device 410 and the remote device 420. Then, in step S4504, the remote device 420 starts a timer corresponding to the determined timing. As described above, the time taken for information processing by the relay device 410 and the remote device 420 and the time taken for signal transmission between the relay device 410 and the remote device 420 may be ignored. Therefore, it may be considered that the relay device 410 and the remote device 420 start a timer at the same time in step S4504.

When the timer expires, the remote device 420 transmits the next link maintenance message to the relay device 410, as shown in step S4604. Then, steps S4204 to S4504 are repeated.

According to the present embodiment, the remote device 420 may flexibly configure, based on the measured state of the link, the time at which the relay device 410 transmits the next link maintenance message. If the state of link is good, the timing for transmitting the next link maintenance message may be postponed, such that the frequency of signaling interaction can be reduced, thereby reducing signaling overheads. Otherwise, if the state of link is not good, the time for transmitting the next link maintenance message may be advanced.

A fourth embodiment according to the present disclosure is described below in conjunction with FIG. 5A to FIG. 5C. The fourth embodiment is applicable to the architecture of the communication system shown in FIG. 3A, that is, a unidirectional communication may be performed between the relay device and the remote device.

Figure 5A:
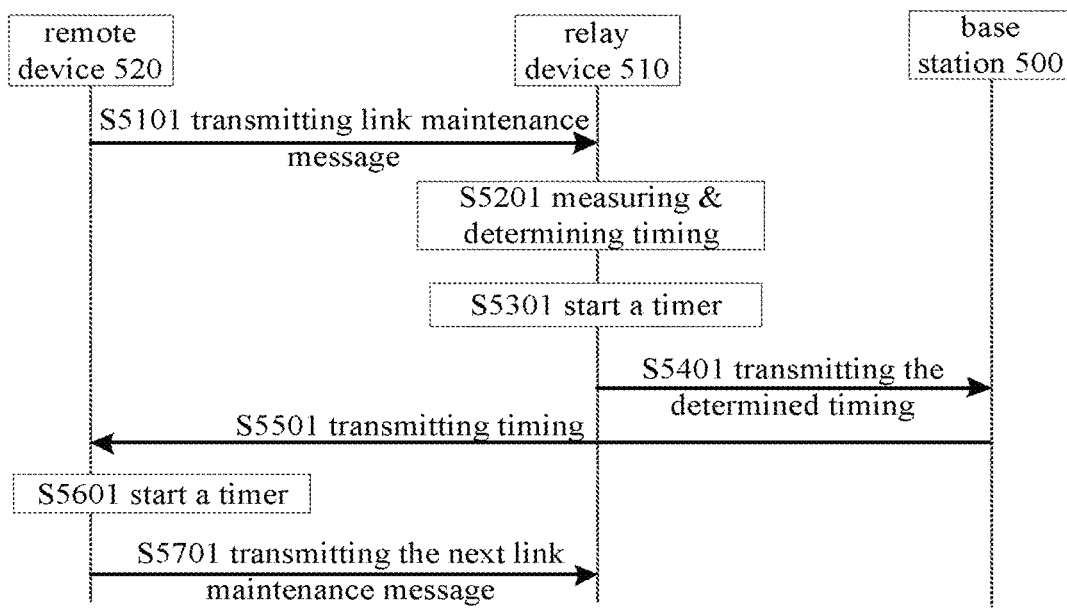
FIG. 5A shows a first signaling flow of link maintenance according to a fourth embodiment of the present disclosure.

FIG. 5A shows a first signaling flow of link maintenance according to the fourth embodiment of the present disclosure. As shown in FIG. 5A, in step S5101, a remote device 520 transmits a link maintenance message to a relay device 510. In step S5201, the relay device 510 determines a level of a state of link by measuring the received link maintenance message, and determines a timing at which the remote device 520 transmits the next link maintenance message based on the level of the state of link determined currently and the levels of the historical states of link. The manner for determining the timing is the same as that descried in conjunction with FIG. 4A in the third embodiment (for example, based on Table 1 and Table 2), and therefore is omitted here.

Then, in step S5301, the relay device 510 starts a timer which is corresponding to the determined timing. In step S5401, the relay device 510 transmits the determined timing to a base station 500. In step S5501, the base station 500 notifies the remote device 520 of the timing. In step S5601, the remote device 520 starts a timer which is corresponding to the received timing. As described above, the time taken for signal transmission between the device and the base station may be ignored. Therefore, it may be considered that the relay device 510 starts a timer in step 5301 and the remote device 520 starts a timer in step S5601 substantially at the same time.

During the timer is started, the remote device 520 does not transmit a link maintenance message, and the relay device 510 also does not monitor a link maintenance message. When the timer expires, the remote device 520 transmits the next link maintenance message to the relay device 510, as shown in step S5701. Then, steps S5201 to S5701 are repeated.

In the embodiment, since a unidirectional relay mode is employed, the relay device 510 cannot directly notify the remote device 520 of the timing determined by the relay device 510. Therefore, it is required to notify, via the base station 500, the remote device 520 of the timing determined by the relay device 510 to transmit the next link maintenance message.

Figure 5B:
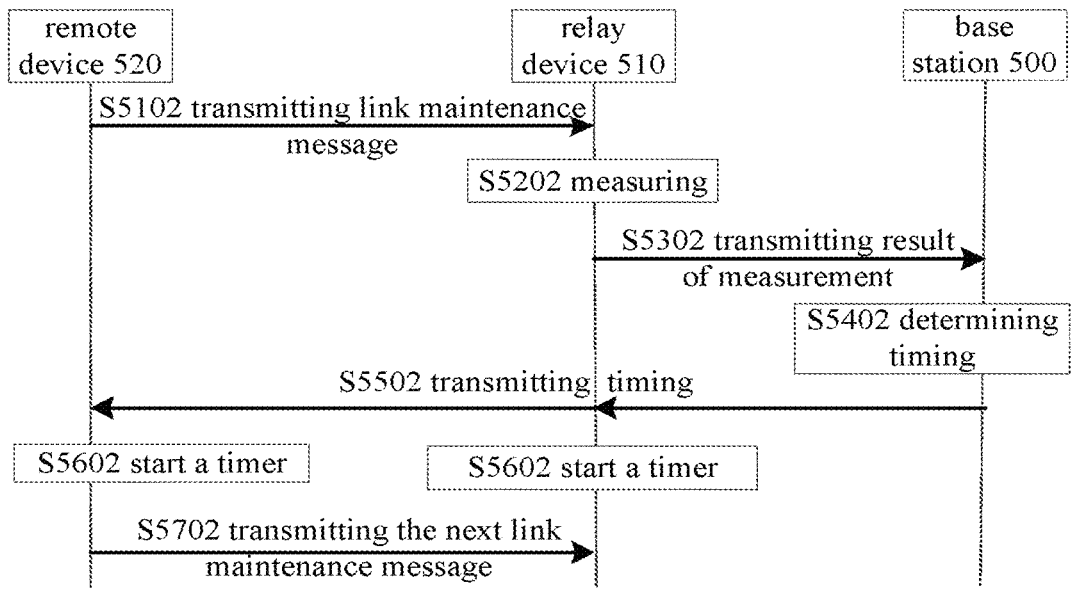
FIG. 5B shows a second signaling flow of link maintenance according to the fourth embodiment of the present disclosure.

FIG. 5B shows a second signaling flow of link maintenance according to a fourth embodiment of the present disclosure. As shown in FIG. 5B, in step S5102, the remote device 520 transmits a link maintenance message to the relay device 510. The relay device 510 measures the received link maintenance message in step S5202, and transmits the measurement result to the base station 500 in step S5302.

In step 5402, the base station 500 determines a level of a state of link based on the received measurement result, and determines a timing at which the remote device 520 transmits the next link maintenance message based on the level of the state of link determined currently and the levels of the historical states of link determined previously in the same manner. The manner that the base station 500 determines the timing is the same as that described in conjunction with FIG. 4A in the third embodiment, and therefore is omitted here.

Then, in step S5502, the base station 500 notifies the relay device 510 and the remote device 520 of the determined timing. Then, in step S5602, the relay device 510 and the remote device 520 start a timer at the same time, an expiration time of which corresponds to the timing notified by the base station 500.

When the timer expires, the remote device 520 transmits the next link maintenance message to the relay device 510, as shown in step S5702. Then, steps S5202 to S5702 may be repeated.

Figure 5C:
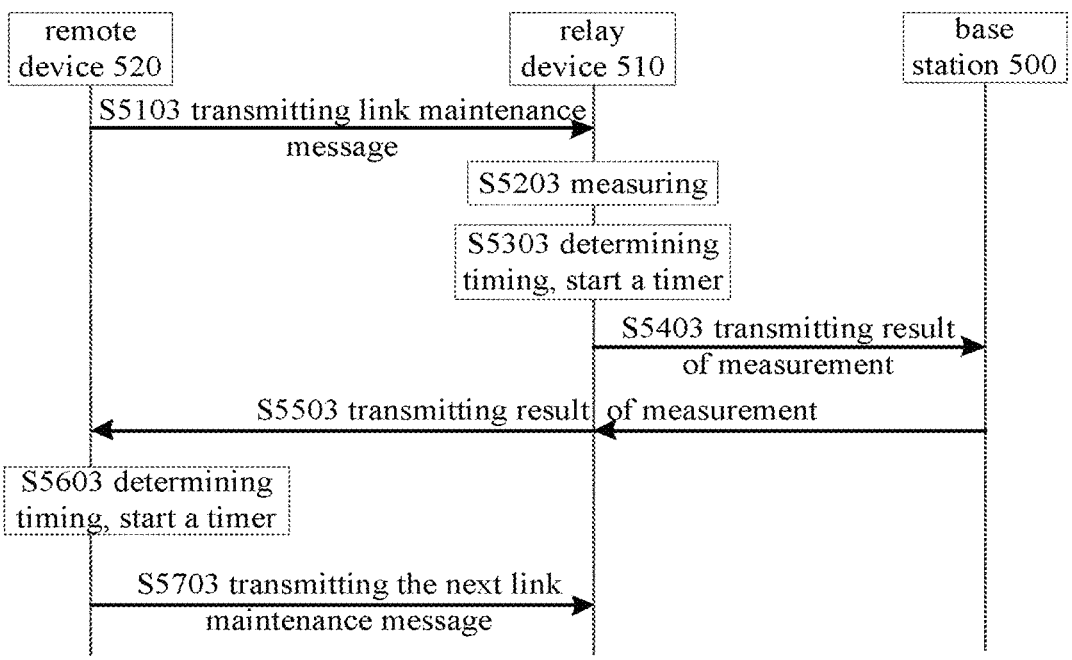
FIG. 5C shows a third signaling flow of link maintenance according to the fourth embodiment of the present disclosure.

FIG. 5C shows a third signaling flow of link maintenance according to the fourth embodiment of the present disclosure. In the embodiment, the relay device 510 and the remote device 520 store in advance the same tables for determining the timing for transmitting the link maintenance message, such as Table 1 and Table 2 as described above.

As shown in FIG. 5C, in step S5103, the remote device 520 transmits a link maintenance message to the relay device 510. In step S5203, the relay device 510 measures the received link maintenance message. Then, the relay device 510 determines a timing for transmitting the next link maintenance message by referring to Table 1 and Table 2 based on the measurement result, and the relay device 510 starts a timer corresponding to the determined timing, as shown in step S5303. Furthermore, in step S5403, the relay device 510 transmits the measurement result to the base station 500. It is to be noted that step S5403 and step S5303 may be performed simultaneously.

Then, in step S5503, the base station 500 transmits the measurement result to the remote device 520. The remote device 520 determines a timing for transmitting the next link maintenance message (which is the same as the timing determined by the relay device 510) by referring to the same tables based on the received measurement result, and starts a timer corresponding to the determined timing, as shown in step S5603. As described above, the time taken for signal transmission between the devices is short with respect to the duration of the timer, and therefore the time taken for signal transmission may be ignored. In this case, it may be considered that the remote device 520 and the relay device 510 start the timer at the same time.

When the timer expires, the remote device 520 transmits the next link maintenance message to the relay device 510, as shown in step S5703. Then, steps S5203 to S5703 may be repeated.

Figure 6A:
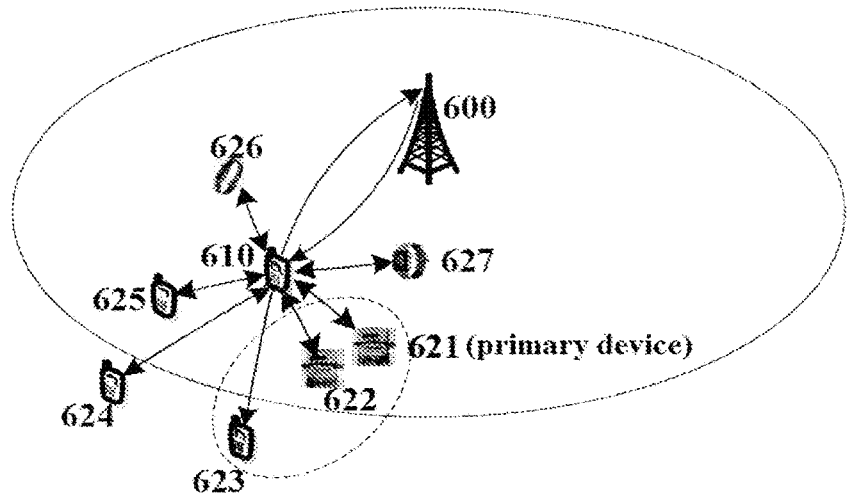
FIG. 6A schematically shows an architecture of a communication system to which a fifth embodiment of the present disclosure is applicable.

A fifth embodiment according to the present disclosure is described below in conjunction with FIG. 6A to FIG. 6E. FIG. 6A schematically shows an architecture of a communication system to which a fifth embodiment is applicable. In the communication system, a bidirectional relay mode is employed.

As shown in FIG. 6A, a base station 600 communicates with a relay device 610, and the relay device 610 performs a bidirectional communication with multiple remote devices 621 to 627. In this case, for the relay device 610, one-to-one link maintenance process between the relay device and remote devices requires a large amount of signaling overheads and energy consumption. In view of the problem, a scheme is provided according to a fifth embodiment of the present disclosure, in which the multiple remote devices are grouped into groups and a primary device is selected for each group. Besides, the primary device performs link maintenance with the relay device 610 on behalf of the group.

For example, in FIG. 6A, remote devices 621, 622, and 623 are grouped into one group, which are encircled by a dotted line circle, and the remote device 621 serves as a primary device for the group. It is to be noted that, although one group is schematically shown in FIG. 6A, remote devices 621 to 627 may further include the other groups.

In the embodiment, the relay device 610 may group remote devices into groups. Specifically, before grouping, the relay device 610 receives a link maintenance message from each of remote devices, and the relay device 610 measures the received link maintenance messages. Therefore, the relay device 610 may group the remote devices based on measurement results (such as the receiving power). For example, multiple remote devices for which the measurement results are within the same range are grouped into one group. As a simple example, the remote devices for which measurement results are greater than a specific threshold are grouped into one group, and the remote devices for which measurement results are less than a specific threshold are grouped into another group. However, the number of groups is not limited to two and there may be more groups. In addition to performing grouping based on measurement results, the relay device 610 may group the remote devices which satisfy one of the following conditions into one group: the relay device 610 and the remote device have a mutual trust relationship, and a connection between the relay device 610 and the remote device has been maintained for a long time period. Hereinafter, a link maintenance process in the case that the relay device determines the grouping is described in conjunction with FIG. 6B and FIG. 6C.

Instead of performing grouping by the relay device 610, remote devices may be grouped by the base station or an entity at a network side. In the case that the base station performs grouping, the relay device 610 and the multiple remote device 621 to 627 periodically report their own position information to the base station. Therefore, the base station may group remote devices close to each other into one group based on the obtained position information and notifies the relay device 610 of the grouping information. In the case that the received position information is changed, the base station may perform grouping again and notifies the relay device 610 of the updated grouping information. The case where the grouping is performed by the entity at the network side (such as MME) is similar to the case where the grouping is performed by the base station as described above, except that the MME needs to obtain the position information from the relay device and the remote devices via the base station and transmit the grouping information to the relay device via the base station. Hereinafter, a link maintenance process in the case that the base station performs grouping is described in conjunction with FIG. 6D and FIG. 6E.

After remote devices are grouped, a primary device for each group may be determined in one of the following manners.

- the primary device is determined based on a power level or energy consumption for each of remote devices in the group. For example, the relay device 610 may request each of remote devices to report its power information and then select a remote device having a higher power level as the primary device;
- the primary device is selected in a predetermined order in the group. That is, each remote device in the group alternately serves as the primary device to perform link maintenance on behalf of the group; and
- a remote device in the group is randomly selected as the primary device.

Figure 6B:
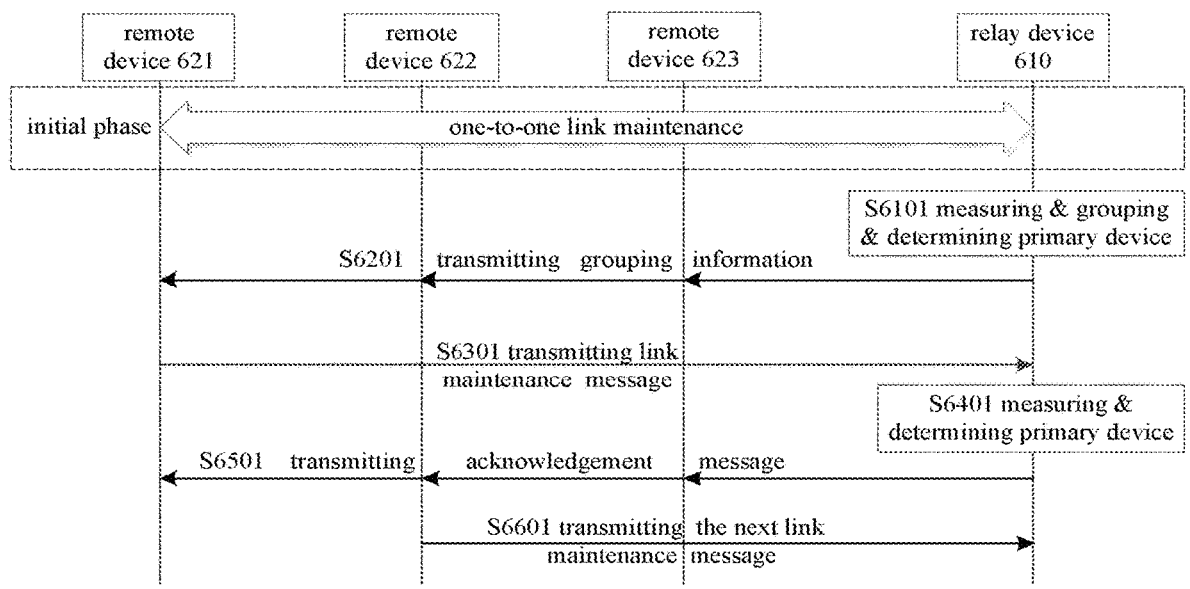
FIG. 6B shows a first signaling flow of link maintenance according to the fifth embodiment of the present disclosure.

FIG. 6B shows a first signaling flow of link maintenance according to a fifth embodiment of the present disclosure. As shown in FIG. 6B, the relay device 610 performs one-to-one link maintenance with each of remote devices 621, 622 and 623 in initial phase. In step S6101, the relay device 610 measures a link maintenance message from each of remote devices and groups the remote devices based on measurement results, and determines a primary device for each group. For conciseness, it is assumed that the remote devices 621, 622 and 623 are grouped into one group and the remote device 621 is determined as a primary device of the group.

Then, in step S6201, the relay device 610 transmits the grouping information to remote devices 621, 622 and 623. The grouping information may include, for example, an identification (ID) of each remote device in the group, an ID of the primary device, and a range of measurement results corresponding to the group. The remote devices 621, 622, and 623 may determine which group they belong to and which remote device serves as the primary device, based on the received grouping information.

Then, in step S6301, the remote device 621 serving as the primary device transmits a link maintenance message to the relay device 610, and the other remote devices in the group do not transmit the link maintenance message.

In step S6401, the relay device 610 measures the link maintenance message from the primary device 621. In step S6501, the relay device 610 transmits an acknowledgement message in response to the link maintenance message to each remote device in the group, that is, the remote devices 621, 622, and 623.

In this manner, the primary device 621 performs a link maintenance process with the relay device 610 on behalf of a group of remote devices, such that energy consumption of the relay device 610 and signaling overheads can be reduced.

Furthermore, in step S6401, the relay device 610 may also re-determine a primary device for the group. As an example, the relay device 610 may determine, based on the measurement result for the link maintenance message from the primary device 621, whether the measurement result is within a range of measurement results corresponding to the group (for example, as described above, the measurement results are greater than a specific threshold or less than a specific threshold). If the measurement result is within the range, the primary device is not changed. Otherwise, if the measurement result is not within the range, it is required to perform grouping again and determine a primary device. As another example, in the case that a primary device is selected in a predetermined order, the relay device 610 may select, in a predetermined order, another remote device in the group, for example the remote device 622, as a primary device.

In the case that the primary device is changed, the relay device 610 may include an ID of the new primary device in an acknowledgement message to transmit to each remote device in step S6501. Then, as shown in FIG. 6B, the new primary device 622 transmits the next link maintenance message to the relay device 610 in step S6601, and other remote devices does not transmit the link maintenance message. Then, steps S6401 to S6501 may be repeated. Specifically, in the case that the primary device is selected in a predetermined order as described above, the relay device 610 may receive the link maintenance message from each remote device, thereby determining the state of link between the relay device 610 and each remote device.

Figure 6C:
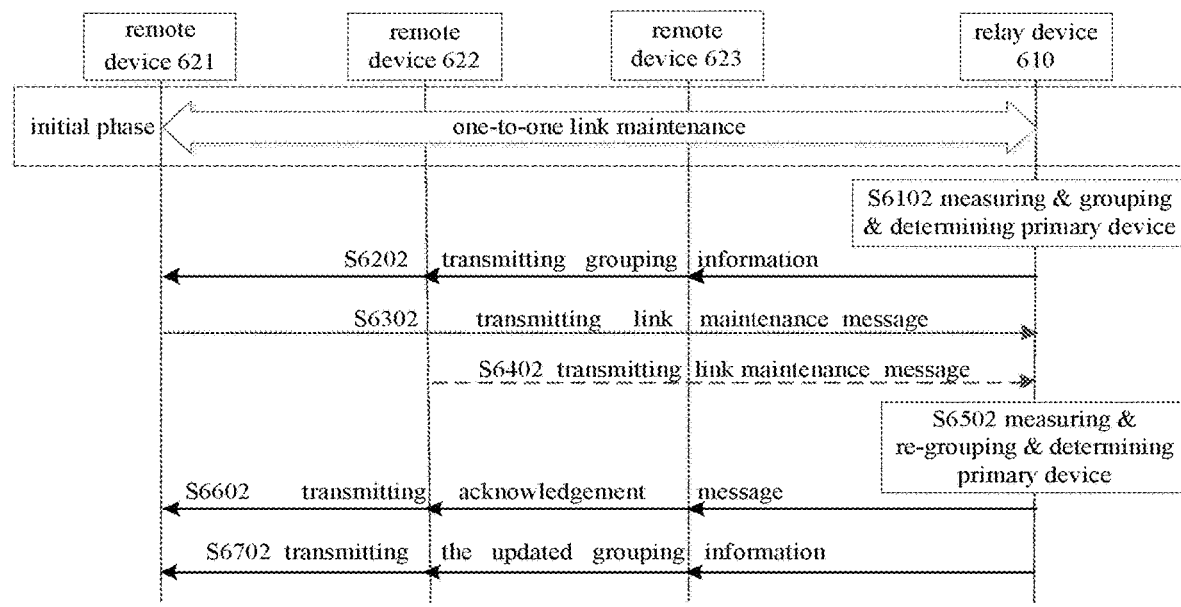
FIG. 6C shows a second signaling flow of link maintenance according to the fifth embodiment of the present disclosure.

FIG. 6C shows a second signaling flow of link maintenance according to the fifth embodiment of present disclosure. As shown in FIG. 6C, the relay device 610 performs one-to-one link maintenance with each of remote devices 621, 622 and 623 in initial phase. In step S6102, the relay device 610 measures a link maintenance message from each of the remote devices and groups the remote devices based on measurement results and determines a primary device for each group. Similar to FIG. 6B, it is still assumed that the remote devices 621, 622 and 623 are grouped into one group, and the remote device 621 is determined as the primary device for the group.

In step S6202, the relay device 610 transmits the grouping information to the remote devices 621, 622 and 623. The grouping information may include, for example, an ID of each remote device in the group, an ID of the primary device, and a range of measurement results corresponding to the group. Then, the primary device 621 transmits a link maintenance message to the relay device 610 in step S6302.

In this case, if the remote device 622 determines, after measuring the grouping information from the relay device 610, that the measurement result is not within a range of measurement results corresponding to the group as indicated by the grouping information, the remote device 622 may also transmits a link maintenance message to the relay device 610 in step S6402.

In step S6502, the relay device 610 measures the link maintenance message from the primary device 621 and the link maintenance message from the remote device 622. In the case that the measurement result for the remote device 622 is not within a range of measurement results corresponding to the group, the relay device 610 performs grouping again and determines a primary device for each group.

Then, in step S6602, the relay device 610 transmits an acknowledgement message in response to the link maintenance message to the remote devices 621, 622 and 623. In step S6702, the relay device 610 transmits the updated grouping information to the remote devices 621, 622 and

623. Then, the primary device indicated by the updated grouping information transmits the next link maintenance message.

Figure 6D:
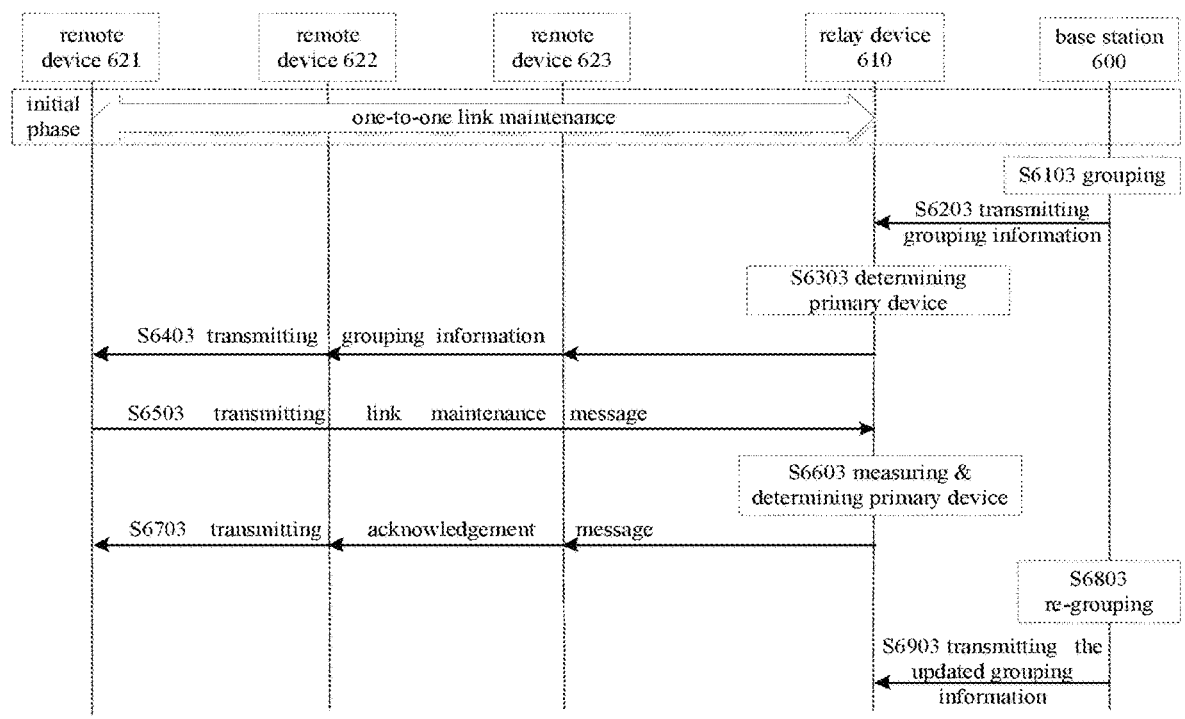
FIG. 6D shows a third signaling flow of link maintenance according to the fifth embodiment of the present disclosure.

FIG. 6D shows a third signaling flow of link maintenance according to the fifth embodiment of the present disclosure. As shown in FIG. 6D, the relay device 610 performs one-to-one link maintenance with each of the remote devices 621, 622 and 623 in initial phase. In another aspect, in step S6103, the base station 600 groups remote devices close to each other into one group based on the position information reported by each of remote devices and transmits the grouping information to the relay device 610 in step S6203.

The relay device 610 may determine the grouping case for the remote devices 621, 622 and 623 based on the received grouping information. For the sake of conciseness, it is still assumed that the remote devices 621, 622 and 623 are grouped into one group. Furthermore, in step S6303, the relay device 610 determines a primary device for the group in the manner described above, and it is assumed that the remote device 621 is determined as a primary device. Then, the relay device 610 transmits the grouping information to each of the remote devices 621, 622 and 623 in step S6403. The grouping information may include an ID of each remote device in the group and an ID of the primary device.

The remote devices receiving the grouping information may determine which group they belong to and which remote device serves as the primary device for the group. In this case, the remote device 621 serving as the primary device may transmits a link maintenance message to the relay device 610 in step S6503, and other remote devices do not transmit the link maintenance message.

In step S6603, the relay device 610 measures the received link maintenance message, and the relay device 610 may determine whether it is required to perform grouping again or change the primary device based on the measurement result, or may select another remote device in the group as a primary device in a predetermined order, as described with reference to FIG. 6B. Then, in step S6703, the relay device 610 transmits an acknowledgement message in response to the link maintenance message from the remote device 621, to each of the remote devices in the group. Specifically, in the case that the primary device is changed, the relay device 610 may also include an ID of the new primary device in the acknowledgement message to transmit to each of the remote devices.

In addition, since the remote devices and the relay device periodically report their position information to the base station 600, in the case that positions of the remote devices and the relay device are changed, the base station 600 may perform regrouping based on the changed positions and transmits the updated grouping information to the relay device 610, as shown in steps S6803 to S6903. Then, the relay device 610 may perform step S6303 again based on the received updated grouping information. It is to be noted that, although FIG. 6D shows that steps S6803 to S6903 are performed after step S6703, the performing order is not limited thereto. The operation that the base station 600 updates and transmits the grouping information may be performed at any time between step S6203 and step S6703 shown in FIG. 6D.

Figure 6E:
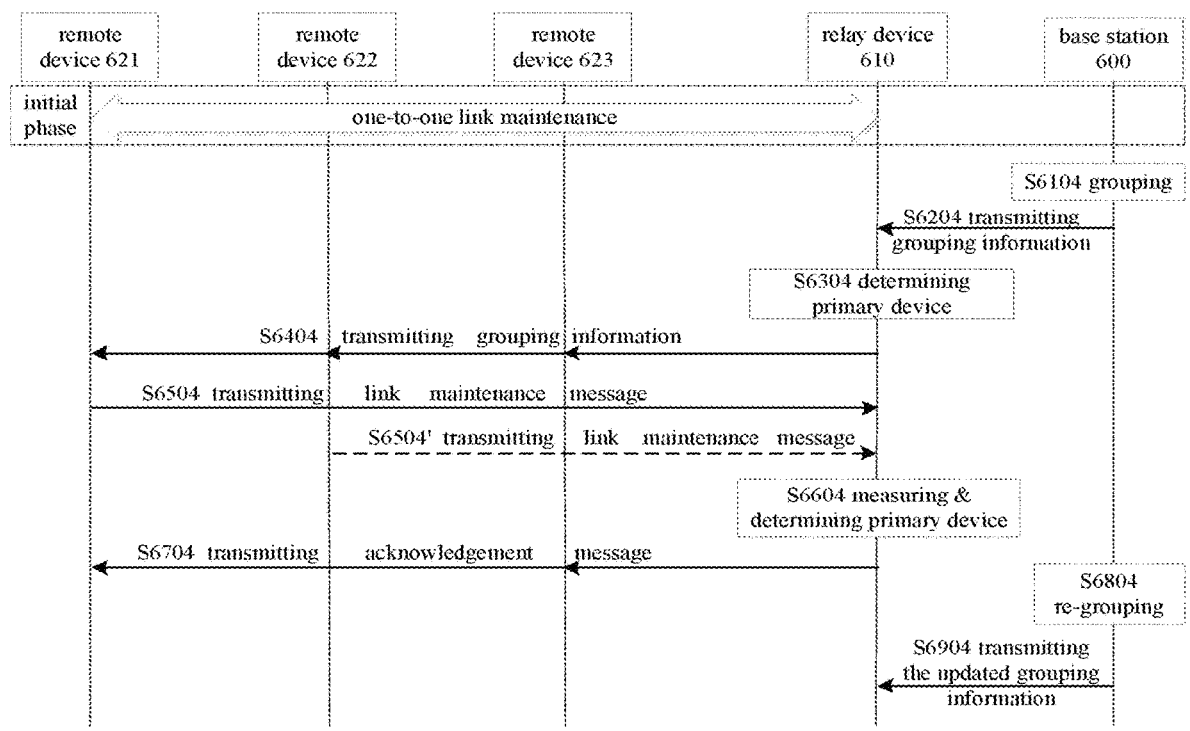
FIG. 6E shows a fourth signaling flow of link maintenance according to the fifth embodiment of the present disclosure.

FIG. 6E shows a fourth signaling flow of link maintenance according to the fifth embodiment of the present disclosure. As shown in FIG. 6E, the relay device 610 performs one-to-one link maintenance with each of the remote devices 621, 622 and 623 in initial phase. In another aspect, the base station 600 groups remote devices close to each other into one group based on the position information reported by each of remote devices in step S6104 and transmits the grouping information to the relay device 610 in step S6204.

The relay device 610 determines the grouping case for the remote devices 621, 622 and 623 based on the received grouping information. It is still assumed that the remote devices 621, 622 and 623 are grouped into one group. Furthermore, in step S6304, the relay device 610 determines a primary device for the group, and it is assumed that the remote device 621 is determined as the primary device. Then, in step S6404, the relay device 610 transmits the grouping information to each of the remote devices 621, 622 and 623. The grouping information may include an ID of each remote device in the group and an ID of the primary device.

Then, in step S6504, the remote device 621 serving as the primary device transmits a link maintenance message to the relay device 610. If the remote device 622 determines, after measuring the grouping information from the relay device 610, that the measurement result is lower than a specific threshold, the remote device 622 may also transmits a link maintenance message to the relay device 610, as shown in step S6504'.

In step S6604, the relay device 610 measures the link maintenance message from the primary device 621 and the link maintenance message from the remote device 622. In the case that the measurement result for the remote device 622 is lower than a specific threshold, the relay device 610 removes the remote device 622 from the group and then performs one-to-one link maintenance with the remote device 622. Since the measurement result below the specific threshold means that a state of the link between the relay device 610 and the remote device 622 has got worse, one-to-one link maintenance would be helpful for the relay device 610 to timely determine the state of link or detect the disconnection of the link.

In the case that the remote device 622 is removed from the group, the relay device 610 transmits an acknowledgement message in response to the link maintenance message from the primary device 621, only to the remote devices 621 and 623 in step S6704, while the acknowledgement message is no longer transmitted to the remote device 622.

Furthermore, similar to the example shown in FIG. 6D, in steps S6804 and S6904, the base station 600 may perform grouping again based on the change in positions of the remote devices and transmit the updated grouping information to the relay device 610, so that the relay device 610 may perform step S6304 again based on the updated grouping information.

Figure 7A:
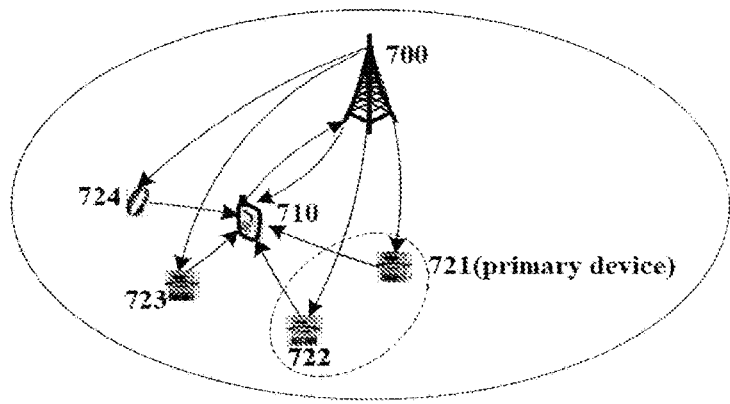
FIG. 7A schematically shows an architecture of a communication system to which a sixth embodiment according to the present disclosure is applicable.

A sixth embodiment according to the present disclosure is described below with reference to FIG. 7A to FIG. 7C. FIG. 7A schematically shows an architecture of a communication system to which the sixth embodiment is applicable. In the communication system, a unidirectional relay mode is employed.

As shown in FIG. 7A, a base station 700 communicates with a relay device 710, and the relay device 710 simultaneously communicates with multiple remote devices 721 to 724. The communication between the relay device 710 and the remote devices is unidirectional (that is, from the remote devices to the relay device). Similar to the fifth embodiment, the multiple remote devices 721 to 724 are grouped in the embodiment, and a primary device of each group performs link maintenance with the relay device 710 on behalf of the group , thereby reducing signaling overheads and energy consumption.

For example, in FIG. 7A, the remote devices 721, 722 are grouped into one group, which is encircled by a dotted line circle, and the remote device 721 is determined as a primary device for the group. It is to be noted that, FIG. 7A schematically shows only one case of grouping, and the remote devices 721 to 724 may also be grouped in other manners.

In the embodiment, multiple remote devices may be grouped by the relay device 710 based on a result of measuring a link maintenance message, or may be grouped by the base station 700 based on positions of the remote devices, which is the same as that described in the fifth embodiment and is omitted here.

Figure 7B:
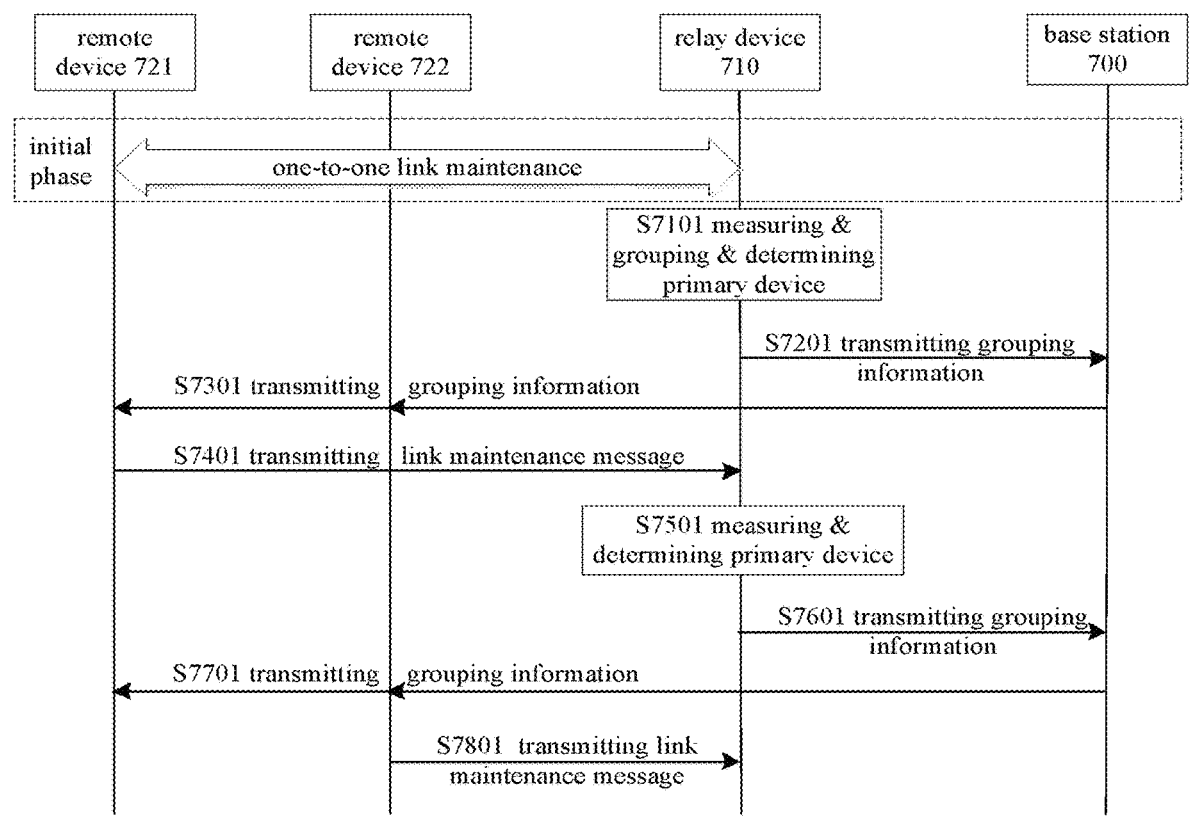
FIG. 7B shows a first signaling flow of link maintenance according to the sixth embodiment of the present disclosure.

FIG. 7B shows a first signaling flow of link maintenance according to the sixth embodiment of the present disclosure. As shown in FIG. 7B, the relay device 710 performs one-to-one link maintenance with each of the remote devices 721, 722 in initial phase. In step S7101, the relay device 710 groups the remote devices by measuring a link maintenance message from each of remote devices and determines a primary device for each group. For conciseness and clarity, it is assumed that the remote devices 721, 722 are grouped into one group and the remote device 721 is determined as a primary device for the group.

Then, in step S7201, the relay device 710 transmits the grouping information to the base station 700. The grouping information may include, for example, an ID of each remote device in the group and an ID of the primary device. Then, in step S7301, the base station 700 transmits the grouping information to the remote devices 721 and 722.

The remote devices 721 and 722 may determine which group they belong to and which remote device serves as the primary device for the group, based on the received grouping information. Then, the remote device 721 serving as the primary device transmits a link maintenance message to the relay device 710 in step S7401, while the remote device 722 does not transmit a link maintenance message.

In step S7501, the relay device 710 measures the link maintenance message from the primary device 721 and determines whether the measurement result is within a range of measurement results corresponding to the group (for example, a range that the measurement results are greater than a specific threshold). If the measurement result is within the range, it is unnecessary to change the group and the primary device. Otherwise, if the measurement result is not within the range, it is required to perform grouping again and determine a primary device. Alternatively, in step S7501, the relay device 710 may also select another remote device (such as the remote device 722) as a primary device in a predetermined order.

Then, the relay device 710 transmits the grouping information determined in step S7501 to the base station 700, as shown in step S7601. In step S7701, the base station 700 transmits the new grouping information to the remote devices 721 and 722.

It is assumed that the relay device 710 determines the remote device 722 as a primary device in step S7501, the remote device 722 transmits a link maintenance message to the relay device 710 in step S7801. The relay device 710 may perform step S7501 again in response to the link maintenance message.

Figure 7C:
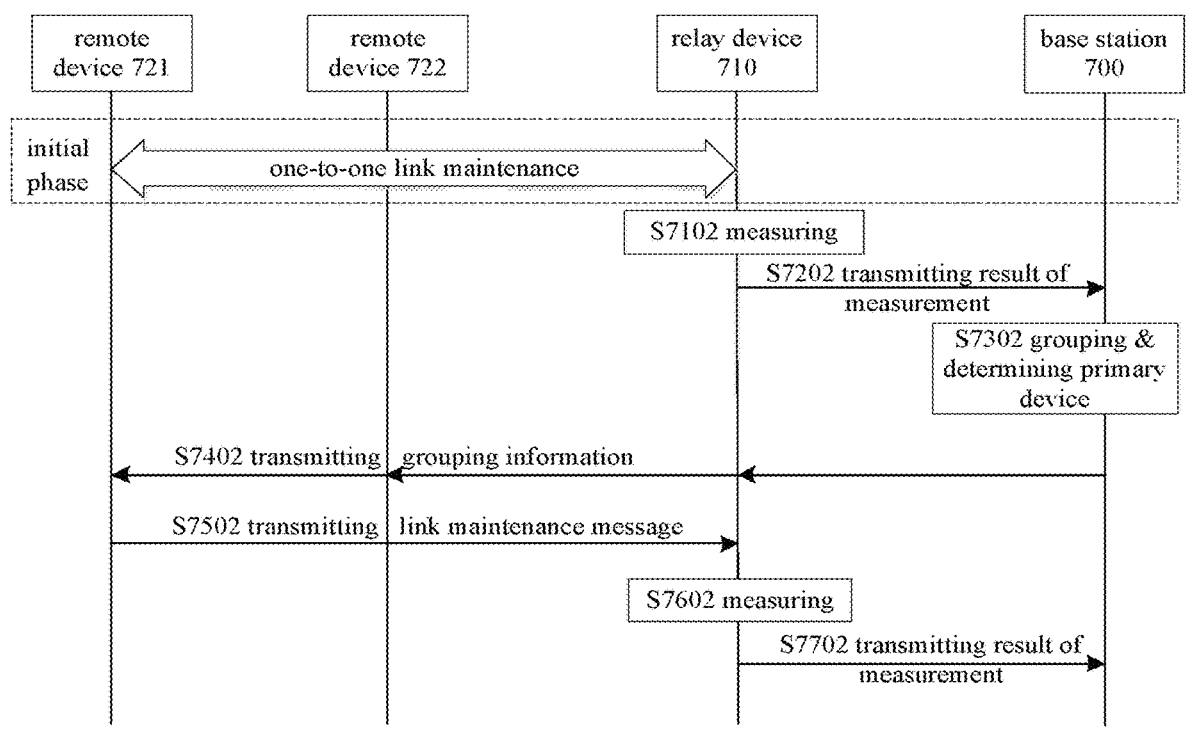
FIG. 7C shows a second signaling flow of link maintenance according to the sixth embodiment of the present disclosure.

FIG. 7C shows a second signaling flow of link maintenance according to the sixth embodiment of the present disclosure. As shown in FIG. 7C, the relay device 710 performs one-to-one link maintenance with each of the remote devices 721, 722 in initial phase. In step S7102, the relay device 710 measures a link maintenance message from each of the remote devices, and in step S7202, the relay device 710 transmits measurement results to the base station 700.

In step S7302, the base station 700 group the remote devices 721, 722 based on position information reported by each of the remote devices and determines a primary device for each group. It is still assumed that remote devices 721, 722 are grouped into one group and the remote device 721 is determined as the primary device for the group.

Then, in step S7402, the base station 700 transmits the grouping information to the relay device 710 and remote devices 721 and 722. The grouping information may include, for example, an ID of each remote device in the group and an ID of the primary device.

Then, in step S7502, the remote device 721 serving as the primary device transmits a link maintenance message to the relay device 710. In step S7602, the relay device 710 measures the link maintenance message. In step S7702, the relay device 710 reports the measurement result to the base station 700. The base station 700 may perform step S7302 again based on the received measurement result.

A seventh embodiment according to the present disclosure is described below with reference to FIG. 8A and FIG. 8B. The seventh embodiment is a variation of the fifth embodiment described with reference to FIG. 6A to FIG. 6E, and therefore, the seventh embodiment is applicable to the communication system shown in FIG. 6A. In this communication system, a base station communicates with a relay device, and the relay device performs bidirectional communication with multiple remote devices. The multiple remote devices are grouped.

Figure 8A:
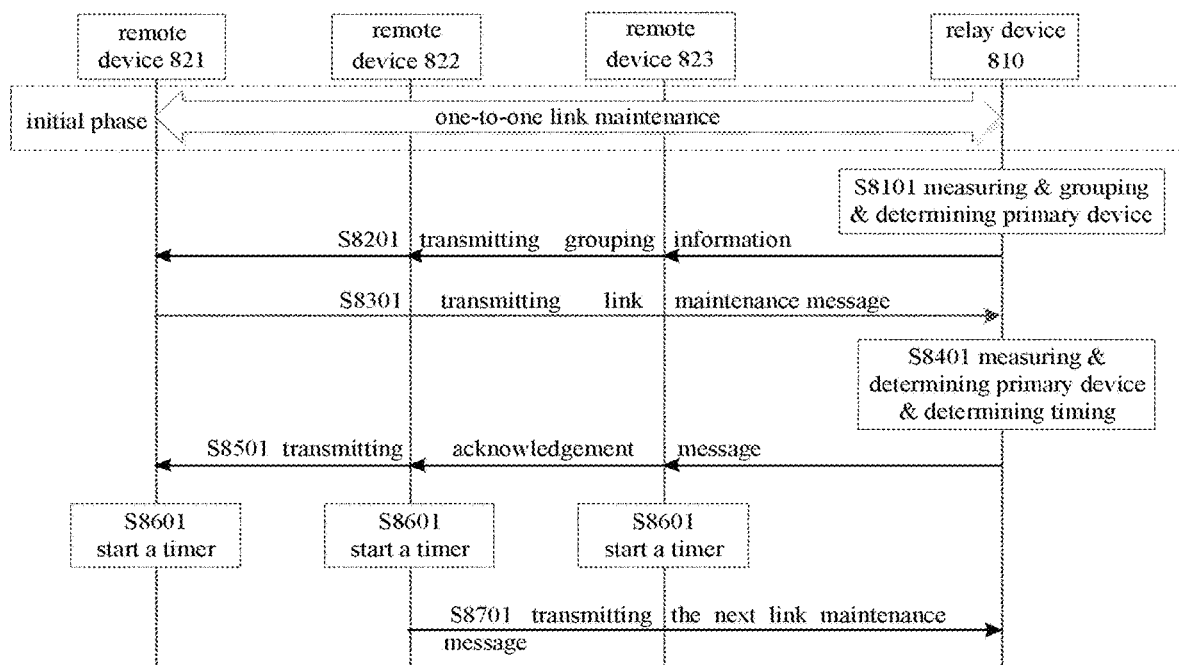
FIG. 8A shows a first signaling flow of link maintenance according to a seventh embodiment of the present disclosure.

FIG. 8A shows a first signaling flow of link maintenance according to the seventh embodiment of the present disclosure. As shown in FIG. 8A, a relay device 810 performs one-to-one link maintenance with each of remote devices 821, 822 and 823 in initial phase. In step S8101, the relay device 810 groups the remote devices by measuring a link maintenance message from each of the remote devices and determines a primary device for each group. The manner of grouping and determining a primary device is the same as that described in the fifth embodiment and therefore is omitted here. For the sake of conciseness, it is assumed that the remote devices 821, 822 and 823 are grouped into one group, and the remote device 821 is determined as the primary device for the group.

Then, in step S8201, the relay device 810 transmits the grouping information to the remote devices 821, 822 and 823. The grouping information may include, for example, an ID of each device in the group and an ID of the primary device. The remote devices 821, 822 and 823 may determine, based on the received grouping information, which group they belong to and which remote device serves as the primary device for the group.

Then, the remote device 821 serving as the primary device transmits a link maintenance message to the relay device 810 in step S8301, while other remote devices in the group do not transmit the link maintenance message.

In step S8401, the relay device 810 measures the link maintenance message from the primary device 821 and determines whether it is required to perform grouping again or change the primary device, based on the measurement result, which is similar to step S6401 described in the fifth embodiment. The embodiment differs from the fifth embodiment in that, in step S8401, the relay device 810 determines a timing at which the primary device transmits the next link maintenance message further based on a result of measuring the link maintenance message from the primary device 821.

Specifically, the relay device 810 may determine a level of a state of link by referring to Table 1 as described above, based on the measurement result and a predetermined threshold. Then, the relay device 810 determines a timing for transmitting the next link maintenance message by referring to Table 2 as described above, based on the level of the state of link determined currently and the levels of the historical states of link determined previously.

Then, in step S8501, the relay device 810 transmits an acknowledgement message in response to the link maintenance message from the primary device 821, to each of the remote devices in the group, that is, the remote devices 821, 822 and 823. Specifically, the acknowledgement message includes an ID of the primary device (which is assumed to be the remote device 822) determined by the relay device 810 in step S8401 and the timing for transmitting the next link maintenance message.

The remote devices 821, 822 and 823 start a timer based on the received acknowledgement message, an expiration time of which corresponds to the timing determined by the relay device 810 to transmit the next link maintenance message, as shown in step S8601.

During the timer is started, the new primary device 822 does not transmit the link maintenance message, and the relay device 810 also does not monitor the link maintenance message. When the timer expires, the primary device 822 transmits the next link maintenance message, as shown in step S8701. Then, the relay device 810 may perform step S8401 again.

Figure 8B:
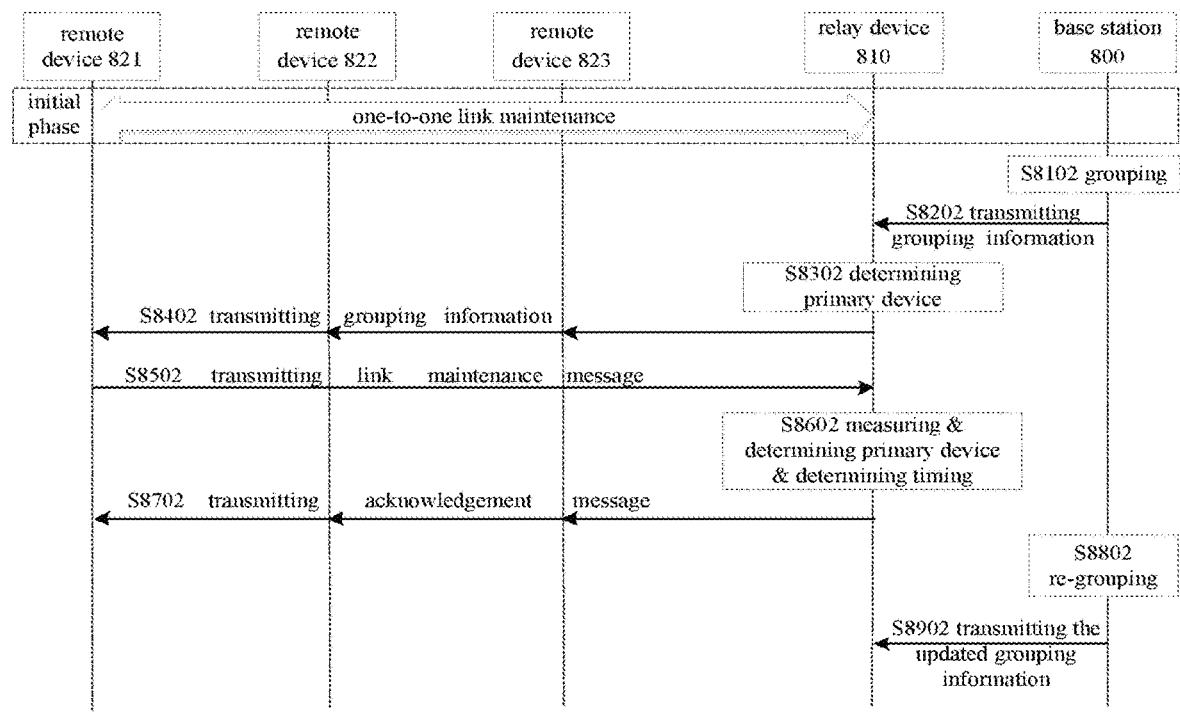
FIG. 8B shows a second signaling flow of link maintenance according to the seventh embodiment of the present disclosure.

FIG. 8B shows a second signaling flow of link maintenance according to the seventh embodiment of the present disclosure. As shown in FIG. 8B, the relay device 810 performs one-to-one link maintenance with each of the remote devices 821, 822 and 823 in initial phase. In another aspect, in step S8102, the base station 800 groups remote devices close to each other into one group based on the position information reported by each of the remote devices and transmits the grouping information to the relay device 810 in step S8202.

The relay device 810 may determine the grouping case for the remote devices 821,822 and 823 based on the received grouping information. For the sake of conciseness, it is assumed that the remote devices 821, 822 and 823 are grouped into one group. Furthermore, the relay device 810 determines a primary device for the group in step S8302, for example, the remote device 821. Then, in step S8402, the relay device 810 transmits the grouping information to each of the remote devices 821, 822 and 823. The grouping information may include an ID of each member in the group and an ID of the primary device.

Then, the remote device 821 serving as the primary device may transmit a link maintenance message to the relay device 810 in step S8502, while the other remote devices do not transmit the link maintenance message.

In step S8602, the relay device 810 measures the received link maintenance message and determines whether it is required to performing grouping again or change the primary device, or alternatively, the relay device 810 may select another remote device in the group as a primary device in a predetermined order, as described above. In addition, the relay device 810 further determines a timing at which the primary device transmits the next link maintenance message by referring to Table 1 and Table 2 based on the measurement result.

Then, in step S8702, the relay device 810 transmits an acknowledgement message in response to the link maintenance message from the primary device 821, to each of the remote devices in the group. The acknowledgement message includes the ID of the primary device determined by the relay device 810 in step S8602 and the timing for transmitting the next link maintenance message. Thus, the primary device indicated by the ID of the primary device will transmit the next link maintenance message to the relay device 810 at the timing.

In another aspect, the base station 800 may group, based on position information reported periodically by the remote devices and the relay device, the remote devices again in the case that positions of the remote devices and the relay device are changed, and transmits the updated grouping information to the relay device 810, as shown in steps S8802 to S8902. Then, the relay device 810 may perform step S8302 again based on the received updated grouping information. It is to be noted that, the time for performing steps S8802 to S8902 is not limited to that shown in FIG. 8B. The operation that the base station 800 updates and transmits the grouping information may be performed at any time between step S8202 and step S8702 shown in FIG. 8B.

In the embodiment, for the bidirectional relay mode, a scheme for grouping remote devices is applied in conjunction with a scheme for determining a timing for transmitting the next link maintenance message based on a state of a link. Therefore, effects of reducing the frequency of signaling interaction (for example, in the case that the state of link is good), reducing signaling overheads and reducing energy consumption can be achieved.

An eighth embodiment according to the present disclosure is described below with reference to FIG. 9A and FIG. 9B. The eighth embodiment is a variation of the sixth embodiment described with reference to FIG. 7A to FIG. 7C, and therefore, the eighth embodiment is applicable to the communication system shown in FIG. 7A. In this communication system, a base station communicates with a relay device, and the relay device performs unidirectional communication with multiple remote devices. The multiple remote devices are grouped.

Figure 9A:
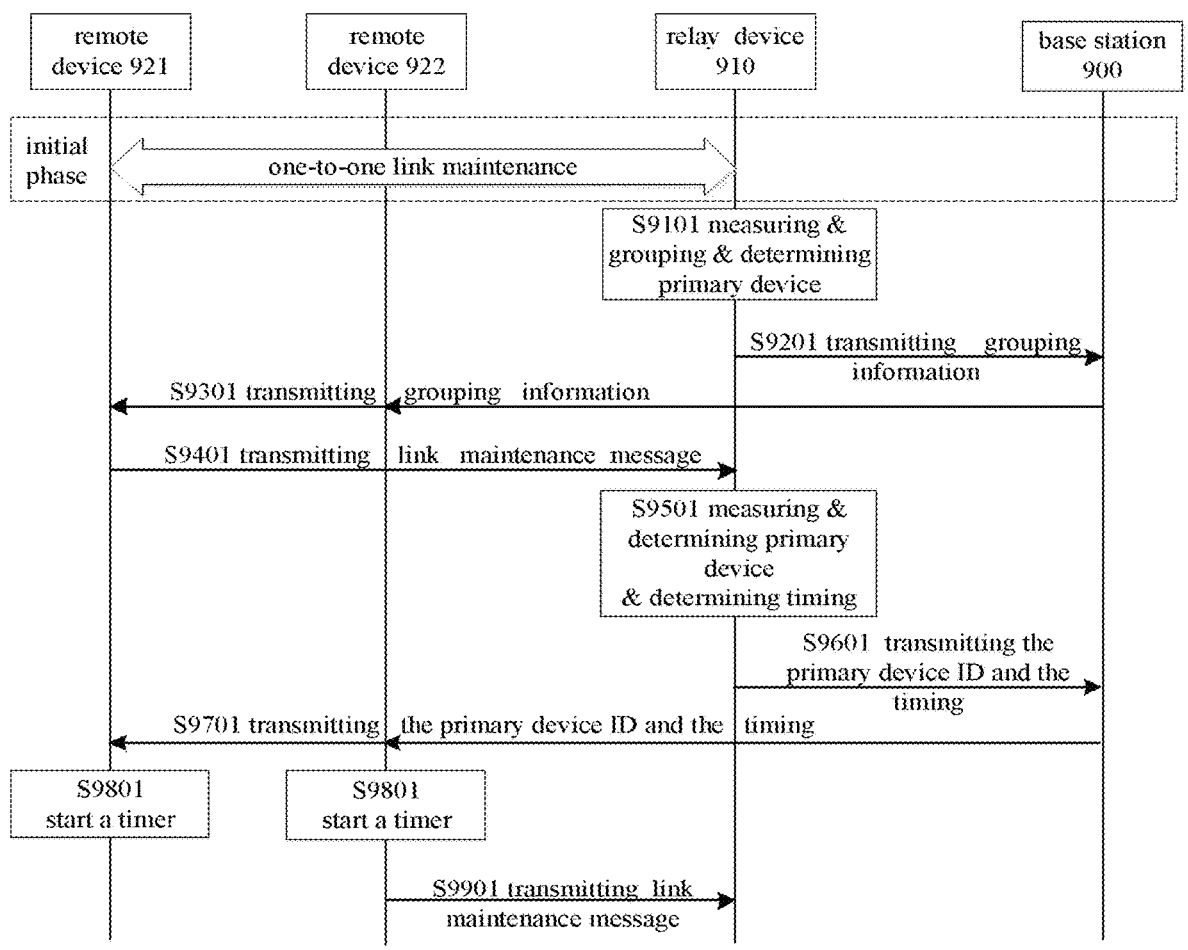
FIG. 9A shows a first signaling flow of link maintenance according to an eighth embodiment of the present disclosure.

FIG. 9A shows a first signaling flow of link maintenance according to the eighth embodiment of the present disclosure. As shown in FIG. 9A, a relay device 910 performs one-to-one link maintenance with each of remote devices 921, 922 in initial phase. In step S9101, the relay device 910 measures a link maintenance messages from each of the remote devices, groups the remote devices based on measurement results and determines a primary device for each group. The manner for performing grouping and determining a primary device is the same as that described above and therefore is omitted here. For the sake of conciseness, it is assumed that the remote devices 921, 922 are grouped into one group, and the remote device 921 is determined as the primary device for the group.

Then, in step S9201, the relay device 910 transmits the grouping information to the base station 900. The grouping information may include, for example, an ID of each remote device in the group and an ID of the primary device. In step S9301, the base station 900 transmits the grouping information to the remote devices 921 and 922.

The remote devices 921 and 922 may determine, based on the received grouping information, which group they belong to and which remote device serves as the primary device for the group. Then, the remote device 921 serving as the primary device transmits a link maintenance message to the relay device 910 in step S9401, while the remote device 922 does not transmit the link maintenance message.

In step S9501, the relay device 910 measures the link maintenance message from the primary device 921 and determines whether it is required to perform grouping again or change the primary device based on the measurement result, or selects a new primary device in a predetermined order, which is similar to step S7501 described in the sixth embodiment. The embodiment differs from the sixth embodiment in that, in step S9501, the relay device 910 determines, further based on a result of measuring the link maintenance message from the primary device 921, a timing at which the primary device transmits the next link maintenance message. Specifically, the relay device 910 may determine a level of a state of link by referring to Table 1 as described above, based on the measurement result and a predetermined threshold. Then, the relay device 910 determines a timing for transmitting the next link maintenance message by referring to Table 2 as described above, based on the level of the state of link determined currently and the levels of the historical states of link determined previously.

Then, in step S9601, the relay device 910 transmits the determined ID of the primary device (which is assumed to be the remote device 922) and the timing for transmitting the next link maintenance message, to the base station 900. Then, in step S9701, the base station 900 transmits the received information to the remote devices 921 and 922.

In step S9801, the remote devices 921 and 922 start a timer corresponding to the timing notified by the base station 900. When the timer expires, a new primary device 922 transmits the next link maintenance message to the relay device 910, as shown in step S9901. In response to receiving the next link maintenance message, the relay device 910 may perform step S9501 again.

Figure 9B:
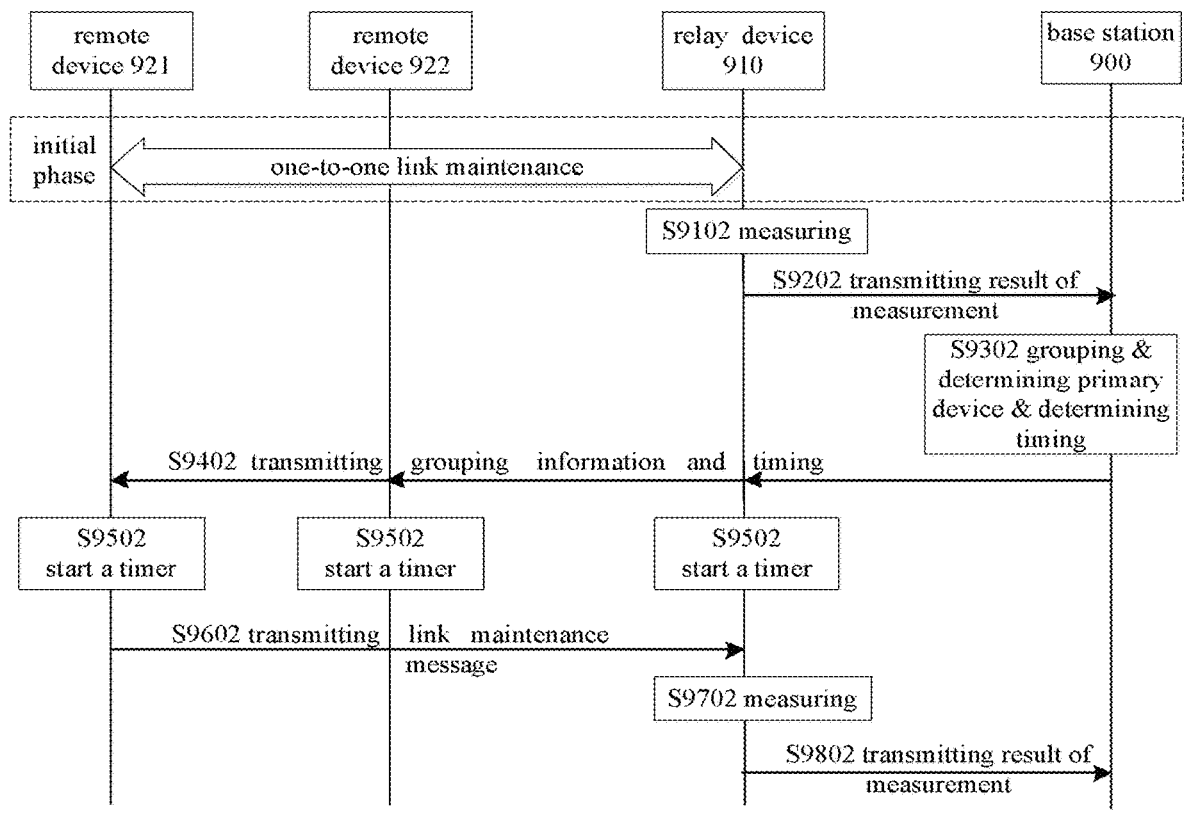
FIG. 9B shows a second signaling flow of link maintenance according to the eighth embodiment of the present disclosure.

FIG. 9B shows a second signaling flow of link maintenance according to the eighth embodiment of the present disclosure. As shown in FIG. 9B, the relay device 910 performs one-to-one link maintenance with each of the remote devices 921, 922 in initial phase. In step S9102, the relay device 910 measures a link maintenance messages from each of the remote devices, and in step S9202, the relay device 910 transmits measurement results to the base station 900.

In step S9302, the base station 900 groups the remote devices 921, 922 based on position information reported by each of the remote devices and determines a primary device for each group, which are similar to step S7302 described in the sixth embodiment. It is still assumed that remote devices 921 and 922 are grouped into one group, and the remote device 921 serves as a primary device for the group. The embodiment differs from the sixth embodiment in that, in step S9302, the base station 900 determines, further based on the measurement result received from the relay device 910, a timing at which the primary device transmits the next link maintenance message. For example, the base station 900 may determine, based on the level of the current state of the link and the levels of the historical states of the link, a timing for transmitting the next link maintenance message by referring to Table 1 and Table 2 as described above.

Then, in step S9402, the base station 900 transmits the determined grouping information and the timing information to the relay device 910 and remote devices 921 and 922. The determined grouping information may include, for example, an ID of each remote device in the group and an ID of the primary device.

Then, in step S9502, the relay device 910 and remote devices 921 and 922 start a timer corresponding to the timing notified by the base station 900. When the timer expires, the remote device 921 serving as the primary device transmits a link maintenance message to the relay device 910 in step S9602. The relay device 910 measures the received link maintenance message in step S9702, and reports the measurement result to the base station 900 in step S9802. The base station 900 performs step S9302 again based on the received measurement result.

In the embodiment, for a unidirectional relay mode, a scheme for grouping remote devices is applied in conjunction with another scheme for determining a timing for transmitting the next link maintenance message based on a state of a link. Therefore, effects of reducing the frequency of signaling interaction (for example, in the case that the state of link is good), reducing signaling overheads and reducing energy consumption can be achieved.

A ninth embodiment according to the present disclosure is described below with reference to FIG. 10. The ninth embodiment is another variation of the fifth embodiment, and therefore, the ninth embodiment is applicable to the communication system shown in FIG. 6A. In this communication system, a base station communicates with a relay device, and the relay device performs bidirectional communication with multiple remote devices. The multiple remote devices are grouped.

In the embodiment, the remote devices satisfying one of the following conditions are grouped into one group: the relay device and the remote device have a mutual trust relationship, and a connection between the relay device and the remote device has been maintained for a long time period. Satisfying one of the above conditions generally means that there is a stable connection between the relay device and the remote device. Therefore, a link maintenance process in which an acknowledgement message is omitted may be performed, as described in the first embodiment according to the present disclosure. That is, in the embodiment, the remote devices capable of performing the link maintenance process in which an acknowledgement message is omitted with the relay device are grouped into one group.

Figure 10:
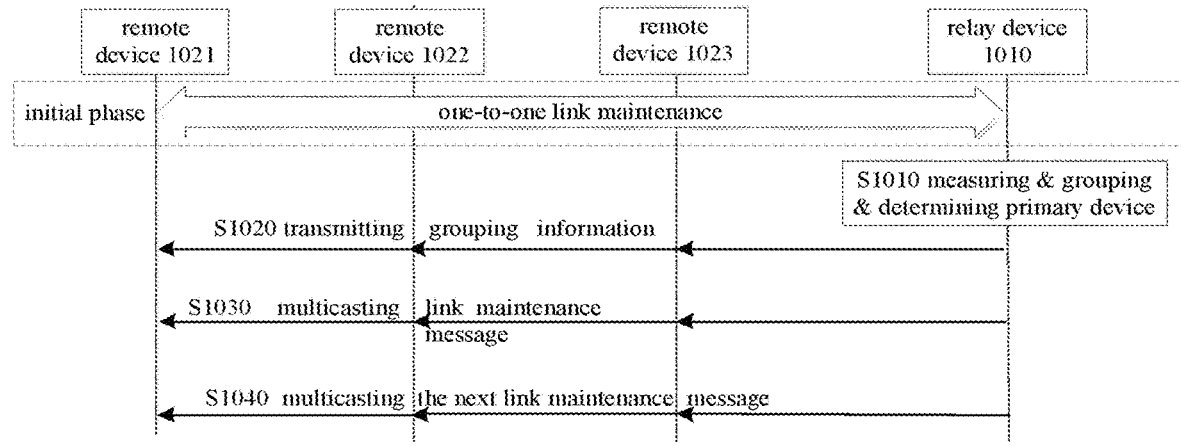
FIG. 10 shows a signaling flow of link maintenance according to a ninth embodiment of the present disclosure.

FIG. 10 shows a signaling flow of link maintenance according to the ninth embodiment of the present disclosure. As shown in FIG. 10, a relay device 1010 performs one-to-one link maintenance with each of remote devices 1021, 1022 and 1023 in initial phase. In step S1010, the relay device 1010 determines a state of each link by measuring a link maintenance message from each of the remote devices. Furthermore, in step S1010, the relay device 1010 groups the remote devices 1021, 1022 and 1023 further based on whether one of the above conditions is satisfied. For the sake of conciseness, it is assumed that each of the remote devices 1021, 1022 and 1023 satisfy one of the above conditions and are grouped into one group. In step S1020, the relay device 1010 transmits the grouping information to each of the remote devices 1021, 1022 and 1023.

Then, in step S1030, the relay device 1010 transmits a link maintenance message to each of the remote devices in a multicast way. Specifically, in the case that the relay device performs one-to-one link maintenance with the remote devices, the relay device needs to transmit a link maintenance message to each of the remote devices in a unicast way. Compared with this case, transmitting a link maintenance message in a multicast way can reduce signaling overheads or energy consumption of the relay device.

As described above, the remote devices 1021, 1022, 1023 and the relay device 1010 perform link maintenance for which an acknowledgement message is omitted. Therefore, the remote devices 1021, 1022 and 1023 do not transmit an acknowledgement message in response to the link maintenance message to the relay device 1010.

In the way as described above, the relay device 1010 may periodically multicast link maintenance message to the remote devices 1021, 1022 and 1023. For example, in step S1040, the relay device 1010 multicasts the next link maintenance message. Similarly, the remote devices 1021, 1022 and 1023 may not feedback an acknowledgement message.

A tenth embodiment according to the present disclosure is described below with reference to FIG. 11A to FIG. 11C. The tenth embodiment relates to releasing a link between a relay device and a remote device.

Figure 11A:
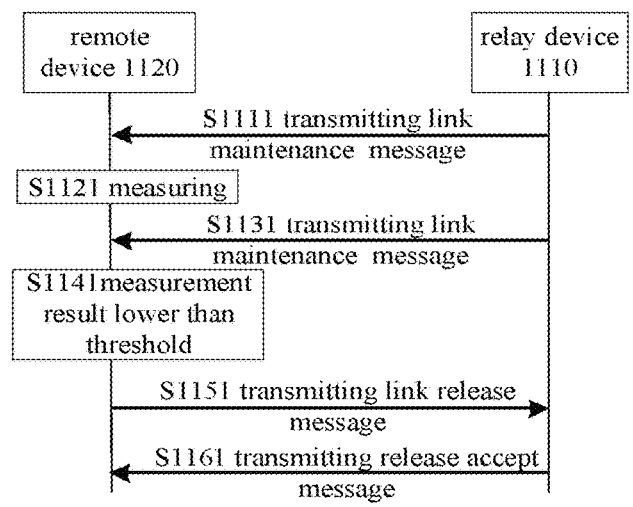
FIG. 11A shows a first signaling flow of link release according to a tenth embodiment of the present disclosure.

FIG. 11A shows a first signaling flow of link release according to the tenth embodiment of the present disclosure. In the embodiment, it is assumed that the relay device and the remote device perform a link maintenance process in which an acknowledgement message is omitted. As shown in FIG. 11A, in step S1111, a relay device 1110 transmits a link maintenance message to a remote device 1120, and in step S1121, the remote device 1120 measures the link maintenance message. In the case that the measurement result indicates that a state of link is normal (for example, the measurement result is greater than a predetermined threshold), the remote device 1120 does not feedback an acknowledgement message. After a certain time period, the relay device 1110 transmits the next link maintenance message to the remote device 1120 in step S1131, and the remote device 1120 measures the next link maintenance message in step S1141. It is assumed that the measurement result in this case is less than a predetermined threshold, it means that the state of link has deteriorated and it is difficult to maintain communication. Therefore, the remote device 1120 transmits a link release message to the relay device 1110 in step S1151 to request for releasing the link. In response to receiving the link release message, the relay device 1110 transmits a release accept message in step S1161, such that the link between the relay device 1110 and the remote device 1120 is disconnected.

Figure 11B:
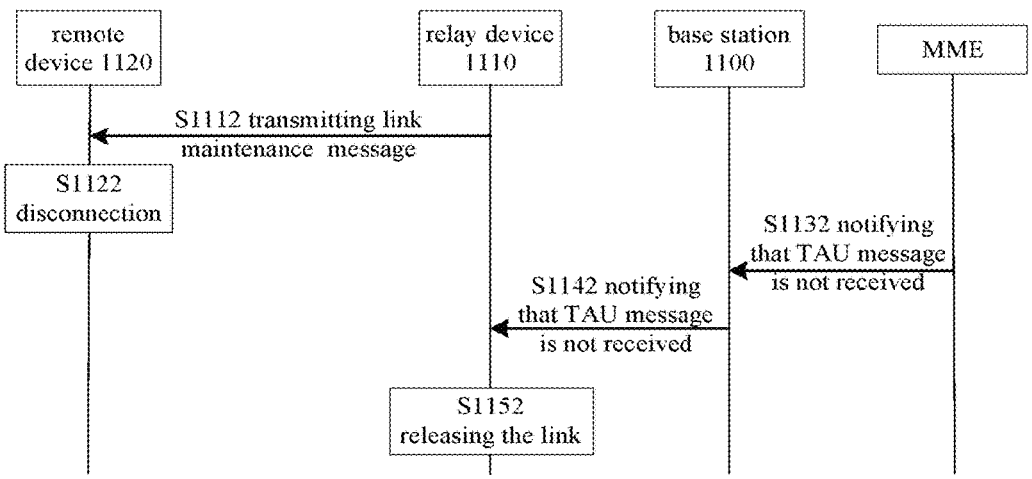
FIG. 11B shows a second signaling flow of link release according to the tenth embodiment of the present disclosure.

FIG. 11B shows a second signaling flow of link release according to the tenth of the present disclosure. In the embodiment, it is still assumed that the relay device and the remote device perform the link maintenance process in which an acknowledgement message is omitted.

As shown in FIG. 11B, in step S1112, the relay device 1110 transmits a link maintenance message to the remote device 1120. It is assumed that the remote device 1120 is suddenly disconnected with the relay device 1110 for some reasons (for example, battery runs out, device failure). In this case, the relay device 1110 cannot receive a link release message from the remote device 1120, that is, the relay device 1110 cannot obtain the notification that the link is disconnected from the remote device 1120. Furthermore, since link maintenance for which an acknowledgement message is omitted, the relay device 1110 cannot determine whether the link is disconnected based on an acknowledgement message.

Since the remote device 1120 periodically transmits a tracking area update (TAU) message to an entity at the network side (such as MME) in normal operation, in case that the remote device 1120 is suddenly disconnected, the MME will no longer receive TAU message from the remote device 1120. In this case, in step S1132, the MME may notify a base station 1100 of a fact that the TAU message is not received from the remote device 1120. In step S1142, the base station 1100 notifies the relay device 1100 of this. After receiving the notification from the base station 1100, the relay device 1110 may determine that the remote device 1120 has been disconnected and then the link is released in step S1152.

Figure 11C:
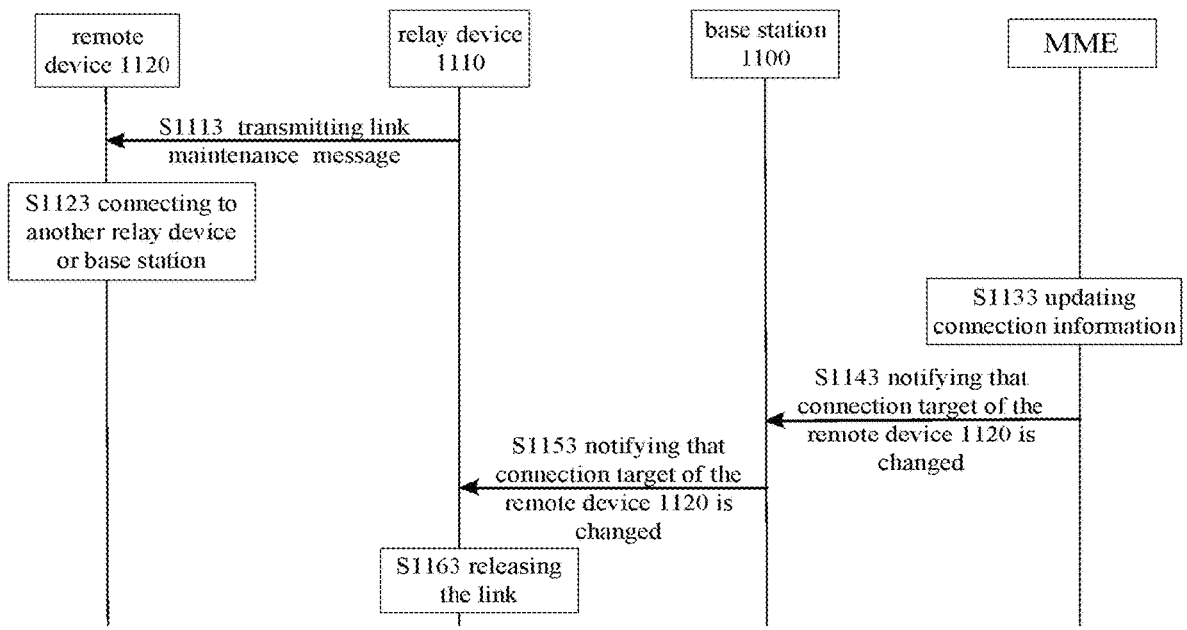
FIG. 11C shows a third signaling flow of link release according to the tenth embodiment of the present disclosure.

FIG. 11C shows a third signaling flow of link release according to the tenth embodiment of the present disclosure. In the embodiment, it is still assumed that a relay device and a remote device perform a link maintenance process in which the acknowledgement message is omitted.

As shown in FIG. 11C, in step S1113, the relay device 1110 transmits a link maintenance message to the remote device 1120. It is assumed that the remote device 1120 has established a connection with other relay devices, or the remote device 1120 has directly established a connection with the base station 1100, as shown in step S1123. Since the relay device 1110 and the remote device 1120 performs the link maintenance in which the acknowledgement message is omitted, the relay device 1110 cannot determine whether the link is disconnected based on the acknowledgement message.

In the case that the remote device 1120 establishes a connection with other devices, the network side entity (such as MME) for storing connection information modifies the previously registered connection information related to the remote device 1120, as shown in step S1133. In step S1143, MME notifies the base station 1100 that the connection target of the remote device 1120 has changed, and then the base station 1100 notifies the relay device 1110 of this fact in step S1153. After receiving the notification from the base station 1100, the relay device 1110 may release the link between the relay device 1110 and the remote device 1120 in step S1163.

Each of the above embodiments according to the present disclosure can be implemented at a Non-Access Stratum (NAS) and a Access Stratum (AS). Specifically, in the case that the embodiment is implemented at the NAS layer, the above link maintenance message may be a "Direct_Communication_Keepalive" message. In the case that the embodiment is implemented at the AS layer, the above link maintenance message may be a "PC5_Discovery_Solicitation" message.

The present disclosure can be applied to various products. For example, the network side device or the base station in the above-described embodiments may include any type of new generation node (such as gNB), and evolved node B (eNB), such as a macro eNB and a small eNB. The small eNB may be an eNB such as pico eNB, micro eNB and home (femto) eNB that covers a cell smaller than a macro cell. Alternatively, the network side device or the base station may further include any other type of base station, such as an NodeB and a base transceiver station (BTS). The base station may include: a main body (which is also referred to as a base station device) configured to control wireless communication; and one or more remote radio heads (RRH) located at positions different from the main body. In addition, various types of terminal devices may function as a base station by performing the function of the base station temporarily or semi-permanently.

In another aspect, the terminal device or the user equipment in the above-described embodiments may be implemented as a communication terminal device (such as a smart phone, a panel personal computer (PC), a notebook PC, a portable game terminal, a portable/dongle mobile router and a digital camera) or an in-vehicle terminal device (such as a car navigation device). The terminal device or the user equipment may also be implemented as a terminal device for performing machine to machine (M2M) communication, which is also referred to as a machine-type communication (MTC) terminal device. Furthermore, the terminal device or the user equipment may be a wireless communication module (such as an integrated circuit module including a single chip) mounted on each of the above terminals.

The implementation of the relay device or the remote device is described below by taking a smart phone as an example in conjunction with FIG. 12.

Figure 12:
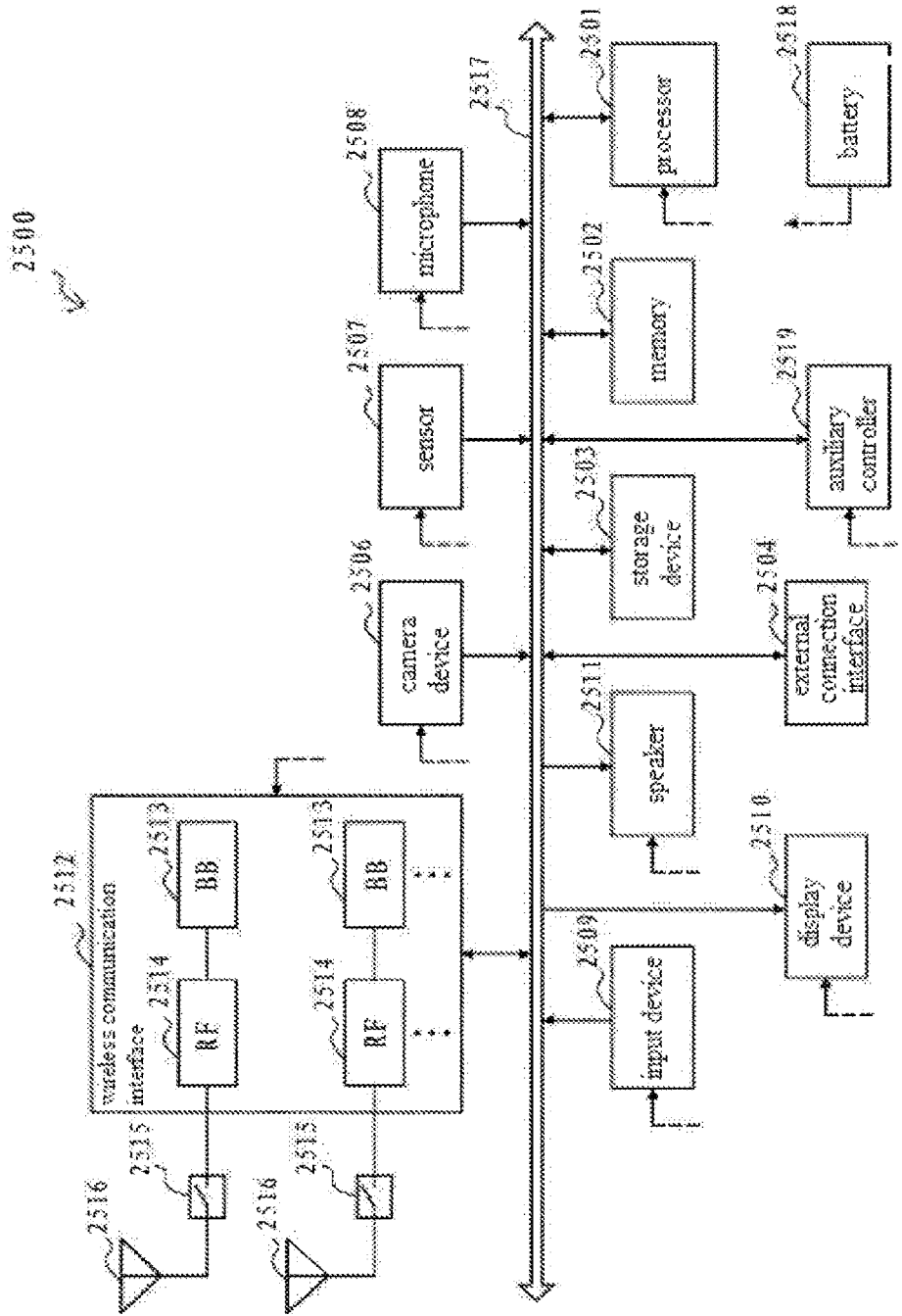
FIG. 12 shows a block diagram of a schematic configuration of a smart phone as an example of a relay device or a remote device.

FIG. 12 shows a block diagram of a schematic configuration of a smart phone. As shown in FIG. 12, a smart phone 2500 includes a processor 2501, a memory 2502, a storage device 2503, an external connection interface 2504, a camera 2506, a sensor 2507, a microphone 2508, an input apparatus 2509, a display apparatus 2510, a loudspeaker 2511, a wireless communication interface 2512, one or more antenna switches 2515, one or more antennas 2516, a bus 2517, a battery 2518 and an auxiliary controller 2519.

The processor 2501 may be, for example, a CPU or a System On Chip (SoC), and controls functions of an application layer and other layers of the smart phone 2500. The memory 2502 includes an RAM and an ROM, and stores a program that is executed by the processor 2501, and data. The storage device 2503 may include a storage medium such as a semiconductor memory and a hard disk. The external connection interface 2504 is an interface for connecting an external device (such as a memory card and a universal serial bus (USB) device) to the smart phone 2500.

The camera 2506 includes an image sensor (such as a charge coupled device (CCD) and a complementary metal oxide semiconductor (CMOS)), and generates a captured image. The sensor 2507 may include a set of sensors such as measurement sensor, gyro sensor, geomagnetic sensor, and acceleration sensor. The microphone 2508 converts sounds that are input to the smart phone 2500 into audio signals. The input device 2509 includes, for example, a touch sensor configured to detect touch on a screen of the display device 2510, a keypad, a keyboard, a button, or a switch, and receives an operation or information input from a user. The display device 2510 includes a screen (such as a liquid crystal display (LCD) and an organic light-emitting diode (OLED) display), and displays an output image of the smart phone 2500. The loudspeaker 2511 converts audio signals that are output from the smartphone 2500 into sounds.

The wireless communication interface 2512 supports any cellular communication scheme (such as LET and LTE-Advanced), and performs wireless communication. The wireless communication interface 2512 may typically include, for example, a baseband (BB) processor 2513 and a radio frequency (RF) circuit 2514. The BB processor 2513 may perform for example coding/decoding, modulation/demodulation and multiplexing/de-multiplexing, and perform various types of signal processes for wireless communication. In addition, the RF circuit 2514 also may include, for example, a mixer, a filter and an amplifier, and transmits and receives wireless signals via an antenna 2516. The wireless communication interface 2512 may be a chip module with the BB processor 2513 and the RF circuit 2514 integrated therein. As shown in FIG. 12, the wireless communication interface 2512 may include multiple BB processors 2513 and multiple RF circuits 2514. However, the wireless communication interface 2512 may also include a single BB processor 2513 or a single RF circuit 2514.

Furthermore, in addition to the cellular communication schemes, the wireless communication interface 2512 may support another type of wireless communication scheme such as short-range wireless communication scheme, near field communication scheme, and wireless local area network (LAN) scheme. In this case, the wireless communication interface 2512 may include the BB processor 2513 and the RF circuit 2514 for each wireless communication scheme.

Each of the antenna switches 2515 switches connection destinations for the antennas 2516 among multiple circuits (such as circuits for different wireless communication schemes) included in the wireless communication interface 2512.

Each of the antennas 2516 includes a single antenna element or multiple antenna elements (such as multiple antenna elements included in an MIMO antenna), and is used for the wireless communication interface 2512 to transmit and receive wireless signals. As shown in FIG. 12, the smart phone 2500 may include the multiple antennas 2516. However, the smart phone 2500 may include a single antenna 2516.

Furthermore, the smart phone 2500 may include the antenna 2516 used for each wireless communication scheme. In this case, the antenna switch 2515 may be omitted in the configuration of the smart phone 2500.

The bus 2517 connects the processor 2501, the memory 2502, the storage device 2503, the external connection interface 2504, the camera 2506, the sensor 2507, the microphone 2508, the input device 2509, the display device 2510, the loudspeaker 2511, the wireless communication interface 2512, and the auxiliary controller 2519 to each other. The battery 2518 supplies power to respective components of the smart phone 2500 via feeders which are partially shown with dashed lines in FIG. 12. The auxiliary controller 2519, for example, performs the minimum function necessary for the smart phone 2500 in a sleep mode.

In the smart phone 2500 as shown in FIG. 12, a transceiving device of the terminal device may be implemented with the wireless communication interface 2512. At least a part of the functions of respective functional units of the terminal device may also be implemented with the processor 2501 or the auxiliary controller 2519. For example, a part of functions of the processor 2501 may be performed by the auxiliary controller 2519 to reduce the consumption of power of the battery 2518 is reduced. Furthermore, the processor 2501 or the auxiliary controller 2519 may perform at least a part of the functions of respective functional units of the terminal device by executing programs stored in the memory 2502 or the storage 2503.

The implementation of the based station is described below by taking eNB as an example in conjunction with FIG. 13.

Figure 13:
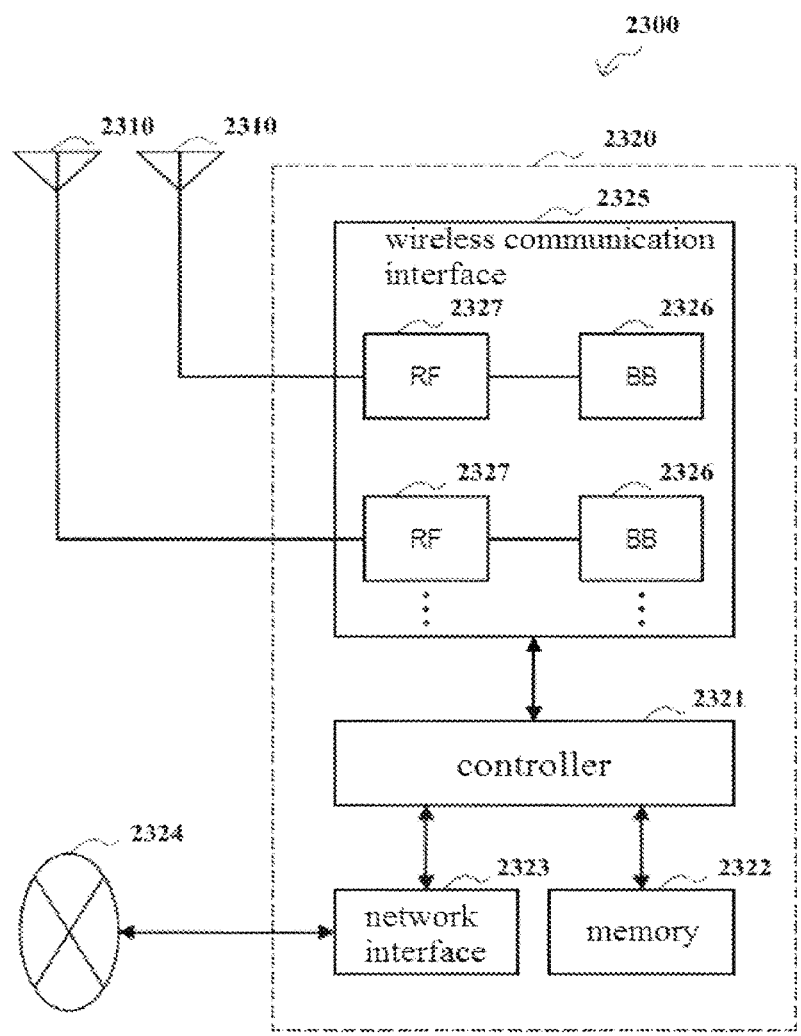
FIG. 13 shows a block diagram of a schematic configuration of an eNB as an example of a base station.

FIG. 13 shows a block diagram of a schematic configuration of an eNB. As shown in FIG. 13, an eNB 2300 includes one or more antennas 2310 and a base station device 2320. The base station device 2320 and each antenna 2310 may be connected with each other via a radio frequency (RF) cable.

Each of the antennas 2310 includes a single antenna element or multiple antenna elements (such as multiple antenna elements included in the multiple-input multiple-output (MIMO) antenna), and is used for the base station device 2320 to transmit and receive wireless signals. As show in FIG. 13, the eNB 2300 may include multiple antennas 2310. For example, the multiple antennas 2310 may be compatible with multiple frequency bands used by the eNB 2300. Although FIG. 13 shows an example in which the eNB 2300 includes multiple antennas 2310, the eNB 2300 may include a single antenna 2310.

The base station device 2320 includes a controller 2321, a memory 2322, a network interface 2323 and a wireless communication interface 2325.

The controller 2321 may be for example a CPU or a DSP, and may perform various functions of higher layers of the base station device 2320. For example, the controller 2321 generates data packets based on the data in the signal processed by the wireless communication interface 2325, and transfers the generated packets via the network interface 2323. The controller 2321 may bundle data from multiple baseband processors to generate bundled packets, and transfer the generated bundled packets. The controller 2321 may have logic functions for performing the following control: radio resource control, radio carrying control, mobility management, admission control and schedule. The control may be performed in conjunction with an adjacent eNB or a core network node. The memory 2322 includes RAM and ROM, and stores a program that is executed by the controller 2321, and various types of control data (such as terminal list, transmission power data, and scheduling data).

The network interface 2323 is a communication interface for connecting the base station device 2320 to a core network 2324. The controller 2321 may communicate with the core network node or another eNB via the network interface 2323. In this case, the eNB 2300 and the core network node or the other eNB may be connected with each other via a logic interface (such as S1 interface and X2 interface). The network interface 2323 may be a wired communication interface or a wireless communication interface for a wireless backhaul line. If the network interface 2323 is the wireless communication interface, the network interface 2323 may use a higher frequency band for wireless communication than that used by the wireless communication interface 2325.

The wireless communication interface 2325 supports any cellular communication schemes (such as long term evolution (LTE) and LTE-Advanced), and provides a wireless connection to a terminal located in the cell of the eNB 2300 via the antenna 2310. The wireless communication interface 2325 may generally include for example the BB processor 2326 and the RF circuit 2327. The BB processor 2326 may perform for example coding/decoding, modulation/demodulation and multiplexing/de-multiplexing, and may perform various signal processing for the layers (for example, L1 layer, media access control (MAC) layer, radio link control (RLC) layer and packet data convergence protocol (PDCP) layer). Instead of the controller 2321, the BB processor 2326 may have a part or all of the above logic functions. The BB processor 2326 may be a memory storing communication control programs, or a module including a processor and a related circuit which are configured to execute programs. Updating the program may change the functions of the BB processor 2326. The module may be a card or a blade inserted into the slot of the base station device 2320. Alternatively, the module may be a chip installed on the card or the blade. In addition, the RF circuit 2327 may also include, for example, a mixer, a filter and an amplifier, and transmits and receives wireless signals via the antenna 2310.

As shown in FIG. 13, the wireless communication interface 2325 may include multiple BB processors 2326. For example, the multiple BB processors 2326 may be compatible with multiple frequency bands used by the eNB 2300. As shown in FIG. 13, the wireless communication interface 2325 may include multiple RF circuits 2327. For example, the multiple RF circuits 2327 may be compatible with multiple antenna elements. Although FIG. 13 shows an example in which the wireless communication interface 2325 includes multiple BB processors 2326 and multiple RF circuits 2327, the wireless communication interface 2325 may include a single BB processor 2326 and a single RF circuit 2327.

In the eNB 2300 shown in FIG. 13, a transceiving device of the base station device may be implemented with the wireless communication interface 2325. At least a part of the functions of respective units may be performed by the controller 2321. For example, the controller 2321 may perform at least a part of the functions of respective units by executing programs stored in the memory 2322.

The various processes described in the above-described embodiments may be implemented with software, hardware or a combination of software and hardware. Programs included in the software may be stored in advance in a storage medium provided inside or outside each device. As an example, when being executed, the programs are written into a random-access memory (RAM) and executed by a processor (such as CPU), so as to perform the various processes described herein.

Figure 14:
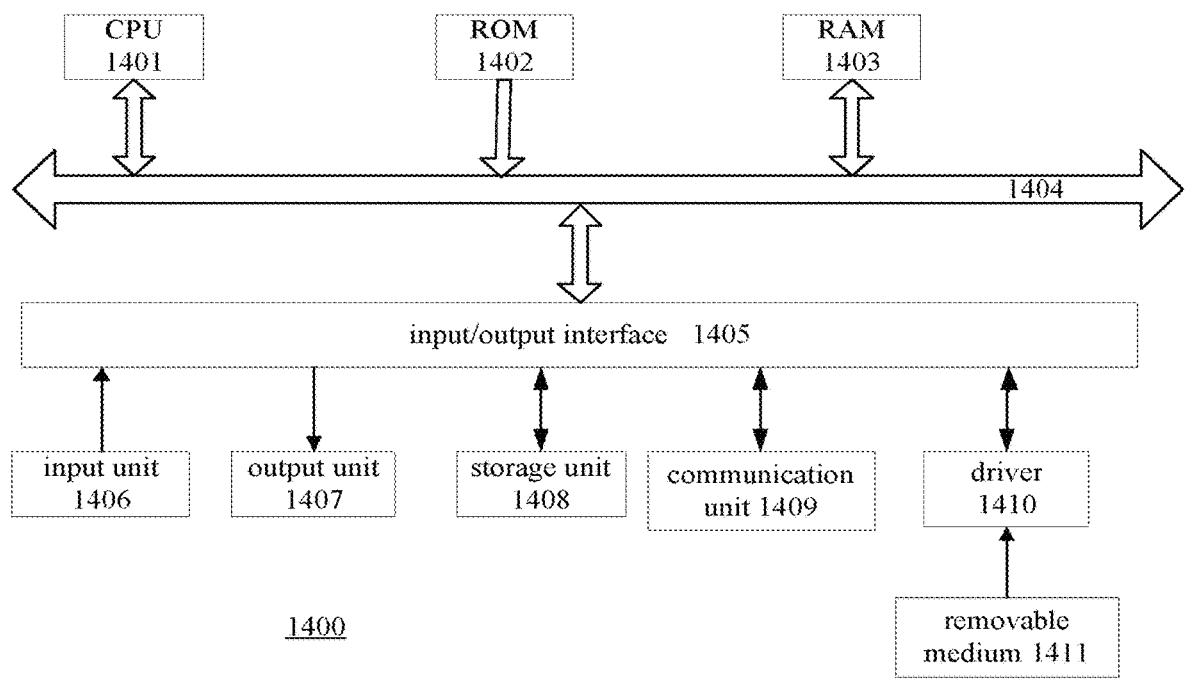
FIG. 14 shows a block diagram of a schematic configuration of computer hardware.

FIG. 14 is a block diagram showing an example configuration of computer hardware that executes the schemes of the present disclosure based on a program.

In a computer 1400, a central processing unit (CPU) 1401, a read only memory (ROM) 1402, and a random access memory (RAM) 1403 are connected with each other via a bus 1404.

An input/output interface 1405 is further connected to the bus 1404. The following components are connected to the input/output interface 1405: an input unit 1406 including keyboard, mouse, microphone and the like; an output unit 1407 including display, loudspeaker and the like; a storage unit 1408 including hard disk, non-volatile memory and the like; a communication unit 1409 including a network interface card (such as Local area network (LAN) card and modem and the like); and a driver 1410 for driving a removable medium 1411 such as magnetic disk, optical disk, magnetic optical disk or semiconductor memory.

In the computer having the above configuration, the CPU 1401 loads the program stored in the storage unit 1408 into the RAM 1403 via the input/output interface 1405 and the bus 1404 and executes the program, to perform the above processes.

A program to be executed by a computer (the CPU 1401) may be recorded in the removable medium 1411 which is a package medium including for example magnetic disk (including floppy disk), optical disk (including compact disk-read only memory (CD-ROM), digital versatile disk (DVD) and the like), magneto-optical disk or semiconductor memory. Furthermore, the program to be executed by the computer (the CPU 1401) may also be provided via a wired transmission medium or a wireless transmission medium such as local area network, the Internet or digital satellite broadcast.

In the case that the removable medium 1411 is mounted in the drive 1410, the program may be installed in the storage unit 1408 via the input/output interface 1405. In addition, the program may be received by the communication unit 1409 via a wired transmission medium or a wireless transmission medium, and then the program may be installed in the storage unit 1408. Alternatively, the program may be installed in advance in the ROM 1402 or the storage unit 1408.

The programs to be executed by the computer may be programs for executing processes in the order described in the specification, or may be programs for executing processes in parallel or executing processes as required (such as when being invoked).

The various devices or units described herein are only logical and do not strictly correspond to physical devices or entities. For example, the functionality of each unit described herein may be implemented by multiple physical entities or the functionality of multiple units described herein may be implemented by a single physical entity. Furthermore, it is to be noted that features, components, elements or steps, and the like described in one embodiment are not limited to the embodiment, but may also be applied to other embodiments. For example, the features, components, elements or steps, and the like described in one embodiment may substitute for specific features, components, elements, or steps, and the like in other embodiments or may be combined with them.

The embodiments and the technical effects of the present disclosure have been described above in detail in conjunction with the drawings, but the scope of the present disclosure is not limited thereto. It should be understood by those skill in the art that various modifications or changes can be made to the embodiments discussed herein without departing from the principle and spirit of the present disclosure, depending on design requirements and other factors. The scope of the present disclosure is defined by the appended claims or their equivalents.

In addition, the present disclosure may also be configured as follows.

An electronic device performing communication with a counterpart communication device, including a processing circuit configured to: when the electronic device and the counterpart communication device satisfy a predetermined condition, determine a state of a link between the electronic device and the counterpart communication device by measuring a link maintenance message transmitted by the counterpart communication device, without transmitting a feedback message in response to the link maintenance message, wherein the link maintenance message is used for confirmation on link maintenance between the electronic device and the counterpart communication device.

In an embodiment, the predetermined condition includes at least one of the followings: the electronic device and the counterpart communication device have a mutual trust relationship, and a duration for which the electronic device and the counterpart communication device are connected with each other is greater than a predetermined value.

In an embodiment, the link maintenance message includes information for indicating, based on whether or not the predetermined condition is satisfied, whether or not the feedback message needs to be transmitted.

The processing circuit is further configured to: when a measurement result is lower than a threshold, generate a message for releasing the link, which message is to be transmitted to the counterpart communication device.

In an embodiment, the counterpart communication device determines disconnection of the link between the electronic device and the counterpart communication device based on a message from a base station.

In an embodiment, the electronic device is a remote device, and the counterpart communication device is a relay device.

In an embodiment, the electronic device includes multiple electronic devices, and wherein when each of multiple electronic devices and the counterpart communication device satisfy the predetermined condition, the multiple electronic devices form a group, and each electronic device in the group measures the link maintenance message multicast by the counterpart communication device, without transmitting the feedback message in response to the link maintenance message.

In an embodiment, the link maintenance message is any one of a link maintenance message of a Non-Access Stratum and a link maintenance message of an Access Stratum.

An electronic device performing communication with a counterpart communication device, including a processing circuit configured to: when the electronic device and the counterpart communication device satisfy a predetermined condition, measure a link maintenance message transmitted by the counterpart communication device, without transmitting a feedback message in response to the link maintenance message; and notify a base station of a measurement result, wherein the link maintenance message is used for confirmation on link maintenance between the electronic device and the counterpart communication device.

The processing circuit is further configured to determine a state of the link based on the measurement result; and notify the base station of the determined state of the link.

In an embodiment, the predetermined condition includes at least one of the followings: the electronic device and the counterpart communication device have a mutual trust relationship, and a duration for which the electronic device and the counterpart communication device are connected with each other is greater than a predetermined value.

In an embodiment, the link maintenance message includes information for indicating, based on whether or not the predetermined condition is satisfied, whether or not the feedback message needs to be transmitted.

In an embodiment, the electronic device is a relay device, and the counterpart communication device is a remote device.

In an embodiment, the link maintenance message is any one of a link maintenance message of a Non-Access Stratum and a link maintenance message of an Access Stratum.

An electronic device performing communication with a counterpart communication device, including a processing circuit configured to: determine a state of a link between the electronic device and the counterpart communication device by measuring a link maintenance message transmitted by the counterpart communication device, wherein the link maintenance message is used for confirmation on link maintenance between the electronic device and the counterpart communication device; and determine, based on the state of the link, a timing at which the counterpart communication device transmits a next link maintenance message.

The processing circuit is further configured to determine the timing further based on historical states of the link, wherein the historical states of the link are determined by measuring link maintenance messages previously transmitted by the counterpart communication device.

The processing circuit is further configured to generate a feedback message including the determined timing, which message is to be transmitted to the counterpart communication device.

In an embodiment, the feedback message is generated and transmitted to the counterpart communication device, such that the counterpart communication device can determine the timing for transmitting the next link maintenance message by measuring the feedback message.

In an embodiment, the electronic device is one of a remote device and a relay device, and the counterpart communication device is the other of the remote device and the relay device.

In an embodiment, the electronic device is a relay device, and the counterpart communication device includes multiple remote devices, wherein the processing circuit is further configured to determine a primary remote device among the multiple remote devices; measure a link maintenance message transmitted by the primary remote device; and determine, based on a measurement result, a timing at which the primary remote device transmits a next link maintenance message.

The processing circuit is further configured to generate a feedback message including the timing determined for the primary remote device, which message is to be transmitted to multiple remote devices.

The processing circuit is further configured to determine the primary remote device in one of the manners of: determining the primary remote device based on available energy and/or energy consumption of multiple remote devices; randomly selecting one of multiple remote devices as the primary remote device; and selecting the primary remote device in a predetermined order among multiple remote devices.

In an embodiment, the link maintenance message is any one of a link maintenance message of a Non-Access Stratum and a link maintenance message of an Access Stratum.

An electronic device performing communication with a counterpart communication device, including a processing circuit configured to determine a state of a link between the electronic device and the counterpart communication device by measuring a link maintenance message transmitted by the counterpart communication device, wherein the link maintenance message is used for confirmation on link maintenance between the electronic device and the counterpart communication device; determine, based on the state of the link, a timing at which the counterpart communication device transmits next link maintenance message; and notify a base station of the determined timing.

The processing circuit is further configured to receive the next link maintenance message from the counterpart communication device according to the determined timing, wherein the next link maintenance message is transmitted by the counterpart communication device according to the timing acquired from the base station.

In an embodiment, the electronic device is a relay device, and the counterpart communication device includes multiple remote devices, wherein the processing circuit is further configured to determine a primary remote device among multiple remote devices; measure a link maintenance message transmitted by the primary remote device; determine, based on a measurement result, a timing at which the primary remote device transmits a next link maintenance message; and notify the base station of the determined timing.

The processing circuit is further configured to receive the next link maintenance message from the primary remote device according to the timing determined for the primary remote device, wherein the next link maintenance message is transmitted by the primary remote device according to the timing acquired from the base station.

An electronic device performing communication with a counterpart communication device, including a processing circuit configured to: measure a link maintenance message transmitted by the counterpart communication device, wherein the link maintenance message is used for confirmation on link maintenance between the electronic device and the counterpart communication device; notify a base station of a measurement result; and receive a next link maintenance message from the counterpart communication device according to a timing notified by the base station, wherein the timing is determined by the base station based on the measurement result.

In an embodiment, the next link maintenance message is transmitted by the counterpart communication device according to the timing acquired from the base station.

In an embodiment, the electronic device is a relay device, and the counterpart communication device includes multiple remote devices, wherein the processing circuit is further configured to: determine a primary remote device among multiple remote devices according to a message from the base station; measure a link maintenance message transmitted by the primary remote device; and notify the base station of a measurement result, such that the base station determines a timing at which the primary remote device transmits a next link maintenance message based on the measurement result.

In an embodiment, the link maintenance message is any one of a link maintenance message of a Non-Access Stratum and a link maintenance message of an Access Stratum.

An electronic device performing communication with multiple communication devices, wherein multiple communication devices are divided into one or more groups, the electronic device including a processing circuit configured to: determine, for each group, a primary communication device of the group; measure a link maintenance message transmitted by the primary communication device of each group; and generate a first feedback message based on a measurement result, which message is to be fed back to each communication device in the group.

The processing circuit is further configured to determine the primary communication device of each group in one of the manners of: determining the primary communication device based on available energy and/or energy consumption of each communication device in the group; randomly selecting one communication device in the group as the primary communication device; and selecting the primary communication device in a predetermined order in the group.

The processing circuit is further configured to: measure the link maintenance messages transmitted by the multiple communication devices respectively, and divide multiple communication devices into the one or more groups based on a measurement result; or divide the multiple communication devices into the one or more groups based on grouping information acquired from a base station, wherein the base station generates the grouping information based on positions of multiple communication devices.

The processing circuit is further configured to: after determining the primary communication device for each group, generate a second feedback message which is to be transmitted to each of the plurality of communication devices, wherein the second feedback message includes information identifying the determined primary communication device.

The processing circuit is further configured to regroup multiple communication devices, upon receipt of link maintenance messages transmitted by another communication device in the group in addition to receipt of the link maintenance message transmitted by the primary communication device, wherein the another communication device transmits the link maintenance messages to the electronic device based on a result of measuring the second feedback message.

The processing circuit is further configured to: determine, based on a result of measuring the link maintenance message transmitted by the primary communication device of each group, a timing at which the primary communication device transmits next link maintenance message; and include the determined timing in the first feedback message.

In an embodiment, the electronic device is a relay device, and the multiple communication devices are multiple remote devices.

In an embodiment, the link maintenance message is any one of a link maintenance message of a Non-Access Stratum and a link maintenance message of an Access Stratum.

An electronic device performing communication with multiple communication devices, wherein the multiple communication devices are divided into one or more groups, the electronic device including a processing circuit configured to: determine, for each group, a primary communication device of the group; measure a link maintenance message transmitted by the primary communication device of each group; and generate a first feedback message for the group based on a measurement result, which message is to be transmitted to a base station, wherein the base station transmits the first feedback message to each communication device in the group.

The processing circuit is further configured to measure the link maintenance messages transmitted by the multiple communication devices respectively, and divide the multiple communication devices into the one or more groups based on a measurement result.

The processing circuit is further configured to determine the primary communication device for each group in one of the manners of: determining the primary communication device based on available energy and/or energy consumption of each communication device in the group; randomly selecting one communication device in the group as the primary communication device; and selecting the primary communication device in a predetermined order in the group.

The processing circuit is further configured to: after determining the primary communication device for each group, generate a second feedback message which is to be transmitted to the base station, wherein the second feedback message includes information identifying the determined primary communication device, and the base station transmits the second feedback message to each communication device in the group.

The processing circuit is further configured to determine, based on a result of measuring the link maintenance message transmitted by the primary communication device of each group, a timing at which the primary communication device transmits a next link maintenance message; and include the determined timing in the first feedback message.

An electronic device performing communication with multiple communication devices, including a processing circuit configured to: based on grouping information acquired from a base station, group the multiple communication devices and determine a primary communication device for each group, wherein the base station generates the grouping information based on positions of the multiple communication devices; measure a link maintenance message transmitted by the primary communication device of each group; and transmit a measurement result to the base station.

In an embodiment, the base station determines, based on the measurement result, a timing at which the primary communication device transmits a next link maintenance message.

In an embodiment, the electronic device is a relay device, and the multiple communication devices are multiple remote devices.

In an embodiment, the link maintenance message is any one of a link maintenance message of a Non-Access Stratum and a link maintenance message of an Access Stratum.

In an embodiment, there is an electronic device configured as a transmission user equipment (UE) in sidelink communication, comprising circuitry configured to: transmit a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relationship of reliability, receive the ACK signal or a negative acknowledgement (NACK) signal from a responding UE, the responding UE being one of the plurality of receiving UEs that is not able to verify the relationship of reliability with the electronic device.

In an embodiment, there is a method performed by an electronic device configured as a transmission user equipment (UE) in sidelink communication, the method comprising: transmitting a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relatioinship of reliability, receiving the ACK signal or a negative acknowledgement (NACK) signal from a responding UE, the responding UE being one of the plurality of receiving UEs that is not able to verify the relationship of reliability with the electronic device.

In an embodiment, there is a non-transitory, computer-readable medium storing instructions that, when executed by an electronic device at a user equipment (UE) side in sidelink communication, control the electronic device to perofrm a method that comprises: transmitting a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relationship of reliablity, receiving the ACK signal or a negative acknowledgement (NACK) signal from a responding UE, the responding UE being one of the plurality of receiving UEs that is not able to verify the relationship of reliability with the electronic device.

The invention claimed is:

1. An electronic device configured as a transmission user equipment (UE) in sidelink communication, comprising circuitry configured to:
  transmit a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relationship of reliability,
  receive the ACK signal or a negative acknowledgement (NACK) signal from a responding UE, the responding UE being one of the plurality of receiving UEs that is not able to verify the relationship of reliability with the electronic device,
  perform a link quality measurement between the electronic device and the plurality of receiving UEs,
  set a timer of the electronic device based on the link quality measurement, and transmit another link maintenance message to the plurality of receiving UEs when the timer expires.

2. The electronic device according to claim 1, wherein the electronic device is a relay user equipment, and the plurality of receiving UEs are remote user equipments.

3. The electronic device according to claim 1, wherein the circuitry sets the timer of the electronic device based on the information about the link quality and based on information about one or more previous link qualities measured by the electronic device.

4. A method performed by an electronic device configured as a transmission user equipment (UE) in sidelink communication, the method comprising:
    transmitting a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relationship of reliability,
    receiving the ACK signal or a negative acknowledgement (NACK) signal from a responding UE, the responding UE being one of the plurality of receiving UEs that is not able to verify the relationship of reliability with the electronic device;
    performing a link quality measurement between the electronic device and the plurality of receiving UEs,
    setting a timer of the electronic device based on the link quality measurement, and,
    transmitting another link maintenance message to the plurality of receiving UEs when the timer expires.

5. The method according to claim 4, wherein the electronic device is a relay user equipment, and the plurality of receiving UEs are remote user equipment.

6. The method according to claim 4, wherein the method further comprising:
    setting the timer of the electronic device based on the information about the link quality and based on information about one or more previous link qualities measured by the electronic device.

7. A non-transitory, computer-readable medium storing instructions that, when executed by an electronic device at a user equipment (UE) side in sidelink communication, control the electronic device to perform a method that comprises:
    transmitting a link control message to a plurality of receiving UEs, wherein the link control message is configured to indicate the plurality of receiving UEs to omit transmitting an acknowledgement (ACK) signal back to the electronic device upon verifying that the electronic device and the plurality of receiving UEs have a relationship of reliability,
    receiving the ACK signal or a negative acknowledgement (NACK) signal from a responding UE, the responding UE being one of the plurality of receiving UEs that is not able to verify the relationship of reliability with the electronic device;
    performing a link quality measurement between the electronic device and the plurality of receiving UEs,
    setting a timer of the electronic device based on the link quality measurement, and,
    transmitting another link control message to the plurality of receiving UEs when the timer expires.

* * * * *